(12) United States Patent
Cote et al.

(10) Patent No.: US 11,820,026 B2
(45) Date of Patent: Nov. 21, 2023

(54) ROBOT AND AUTOMATED GUIDED VEHICLE COMBINATION FOR ALUMINUM FURNACE OPERATIONS

(71) Applicants: DYNAMIC CONCEPT, Saguenay (CA); Patrice Cote, Jonquiere (CA); Jean-Francois Desmeules, Jonquiere (CA); Jean-Benoit Neron, Jonquiere (CA)

(72) Inventors: Patrice Cote, Jonquiere (CA); Jean-Francois Desmeules, Jonquiere (CA); Jean-Benoit Neron, Jonquiere (CA)

(73) Assignee: Dynamic Concept, Saguenay (CA)

( * ) Notice: Subject to any disclaimer, the term of this patent is extended or adjusted under 35 U.S.C. 154(b) by 609 days.

(21) Appl. No.: 16/969,726

(22) PCT Filed: Apr. 23, 2019

(86) PCT No.: PCT/CA2019/050507
§ 371 (c)(1),
(2) Date: Aug. 13, 2020

(87) PCT Pub. No.: WO2019/204919
PCT Pub. Date: Oct. 31, 2019

(65) Prior Publication Data
US 2021/0362341 A1    Nov. 25, 2021

Related U.S. Application Data

(60) Provisional application No. 62/661,147, filed on Apr. 23, 2018, provisional application No. 62/770,971, filed on Nov. 23, 2018.

(51) Int. Cl.
*B25J 9/16* (2006.01)
*B25J 9/00* (2006.01)
(Continued)

(52) U.S. Cl.
CPC ........... *B25J 9/1697* (2013.01); *B25J 13/087* (2013.01); *B25J 13/089* (2013.01);
(Continued)

(58) Field of Classification Search
CPC ...... B25J 9/1697; B25J 9/0009; B25J 13/087; B25J 13/089; B25J 15/0019; B25J 18/025;
(Continued)

(56) References Cited

U.S. PATENT DOCUMENTS 4,239,442 A    12/1980  Maynard
7,792,609 B2    9/2010  Strasse et al.
(Continued)

FOREIGN PATENT DOCUMENTS

CA    2894308    1/2016
CN    102979601    3/2013
(Continued)

OTHER PUBLICATIONS

Extended Search Report dated Jan. 22, 2021, 9 pages, Champion Jerome.
(Continued)

*Primary Examiner* — Kira Nguyen
(74) *Attorney, Agent, or Firm* — Benoit & Cote Inc.; Mathieu Audet; Charles-Andre Carson

(57) ABSTRACT

A displaceable robot for performing operations using a tool near a high temperature furnace containing molten metal, wherein the robot is displaceable using a vehicle. The robot comprising: a frame having a ground interface for coming into contact with a ground surface while defining a clearance under a portion of the frame for engaging with the vehicle to displace the robot about the furnace when the ground interface is off the ground; an arm mounted to the frame, the arm comprising an end effector which is adapted for mount-
(Continued)

ing the tool; a sensor for collecting at least one of exteroceptive data in a vicinity of the robot and proprioceptive data from the robot; and a controller receiving the collected data from the sensor and controlling a movement of at least the arm based on the collected data.

20 Claims, 24 Drawing Sheets

(51) Int. Cl.
*B25J 13/08* (2006.01)
*B25J 15/00* (2006.01)
*B25J 18/02* (2006.01)
*B25J 19/00* (2006.01)
*B66F 9/06* (2006.01)
*H02J 50/10* (2016.01)
*G05D 1/02* (2020.01)

(52) U.S. Cl.
CPC ......... *B25J 15/0019* (2013.01); *B25J 18/025* (2013.01); *B25J 19/005* (2013.01); *B25J 19/0045* (2013.01); *B25J 19/0054* (2013.01); *B66F 9/063* (2013.01); *G05D 1/0214* (2013.01); *G05D 2201/0207* (2013.01); *H02J 50/10* (2016.02)

(58) Field of Classification Search
CPC .. B25J 19/0045; B25J 19/005; B25J 19/0054; B66F 9/063; G05D 1/0214; G05D 2201/0207
See application file for complete search history.

(56) References Cited

U.S. PATENT DOCUMENTS

| | | | |
|---|---|---|---|
| 9,217,998 B2 | 12/2015 | Plache et al. | |
| 9,332,594 B2* | 5/2016 | Holms | F27B 14/061 |
| 9,463,574 B2 | 10/2016 | Purkayastha et al. | |
| 2006/0199125 A1* | 9/2006 | Evans | F27B 7/42 431/174 |
| 2007/0289713 A1 | 12/2007 | Crafton et al. | |
| 2008/0251233 A1* | 10/2008 | Mortimer | F27D 21/00 373/84 |
| 2011/0232925 A1 | 9/2011 | Al-Azemi | |
| 2012/0072004 A1 | 3/2012 | Lopez-Carrasco Picado | |
| 2013/0112042 A1* | 5/2013 | Wang | B22D 1/00 266/216 |
| 2015/0273580 A1* | 10/2015 | Prabhu | B22D 47/02 164/4.1 |
| 2016/0059411 A1 | 3/2016 | Richter et al. | |
| 2016/0153068 A1* | 6/2016 | Pollmann | C22B 21/0092 266/201 |

FOREIGN PATENT DOCUMENTS

| | | |
|---|---|---|
| CN | 203342251 | 12/2013 |
| CN | 104692054 | 6/2015 |
| CN | 205055271 | 3/2016 |
| CN | 205614657 | 10/2016 |
| CN | 205994914 | 3/2017 |
| CN | 107243622 | 10/2017 |
| CN | 107253084 | 10/2017 |
| GB | 2189417 | 10/1987 |
| JP | S57108889 U | 5/1982 |
| JP | 11155970 | 6/1999 |
| JP | 2003252448 | 9/2003 |
| KR | 20160139305 | 12/2016 |
| WO | 2018054934 | 3/2018 |

OTHER PUBLICATIONS

Communication pursuant to Article 94(3) EPC, dated Oct. 29, 2021, Jerome Champion, 10 pages.

* cited by examiner

ROBOT AND AUTOMATED GUIDED VEHICLE COMBINATION FOR ALUMINUM FURNACE OPERATIONS

CROSS-REFERENCE TO RELATED APPLICATION

This application claims priority from U.S. provisional patent application 62/661,147 filed Apr. 23, 2018 and from U.S. provisional patent application 62/770,971 filed Nov. 23, 2018, the specifications of which are hereby incorporated herein by reference in their entirety.

BACKGROUND

(a) Field

The subject matter disclosed generally relates to systems and methods for operating furnaces. More particularly, the subject matter disclosed relates to systems and methods for operating maintenance operations in relation of furnaces in a foundry.

(b) Related Prior Art

Traditionally, in conventional processes for metal castings, operators must operate with furnaces, molten metal and molds, all of which are kept at high temperatures to prevent premature solidification of the molten metal, which results in an excessively difficult environment for the operators. Further, because of the temperature in which operations must be performed, there is a difficulty to design equipment that can operates in these conditions, requiring specific materials capable of resisting the heat of these conditions without premature wear. Furthermore, the permanent locations of some components with respect to the furnaces results in premature wear, therefore costs that operators wants to decrease. Also, existing robots and automated vehicles and not well suited for the such tasks and for the extreme environment of such furnaces.

Accordingly, there is a need for an automation of certain operations in foundries whereby the number of operations performed by operators in a high-temperature environment are limited.

SUMMARY

The proposed system is based on the use of a robot, an Automated Guided Vehicle (AGV) and vision system. The robot comprises a telescopic arm adapted for furnace operations such as skimming and scraping. The AGV is adapted for transportation of the robot between three different locations inside the foundry: a home location, a temporary location and an operating location. The home location is where operations of maintenance are performed such as storage of the robot. The temporary location is where to drop off the robot during the preparation period while the furnace is in operation. The operating location(s) are where the robot is place about the furnace and wherein the robot may perform operations such as skimming and scraping in the furnace.

According to an embodiment, there is provided a displaceable robot for performing operations using a tool near a high temperature furnace containing molten metal, wherein the robot is displaceable using a vehicle, the robot comprising: a frame having a ground interface for coming into contact with a ground surface while defining a clearance under a portion of the frame for engaging with the vehicle to displace the robot about the furnace when the ground interface is off the ground; an arm mounted to the frame, the arm comprising an end effector which is adapted for mounting the tool; a sensor for collecting at least one of exteroceptive data in a vicinity of the robot and proprioceptive data from the robot; and a controller receiving the collected data from the sensor and controlling a movement of at least the arm based on the collected data.

According to an aspect, the sensor comprises an image-capturing sensor mounted on the frame distant from the end effector, wherein the image-capturing sensor collects data regarding at least one of a position of the end effector and a content of the furnace.

According to an aspect, the robot operates according to temperature conditions, wherein the sensor is mounted to the arm about the end effector, and wherein the sensor collects temperature data to determine whether temperature conditions remain within operating parameters of the robot.

According to an aspect, the robot further comprises a cooling system, wherein the cooling system cools down components of the robot.

According to an aspect, the cooling system comprises: an air inlet away from the end effector; a compressor connected to the air inlet and compressing air collected through the air inlet and an outlet connected to the compressor and exhausting compressed air about a component of the robot to be cooled down.

According to an aspect, the robot further comprises a driving assembly driving the robot relative to one of its degrees of freedom; and wherein the outlet exhausts compressed air about at least one of the controller, the sensor, the tool, the end effector and the driving assembly.

According to an aspect, the ground interface comprises feet supporting the frame above ground and wherein the robot comprises feet driving means for vertically extending and contracting the feet thereby respectively raising and lowering the frame, wherein the controller, by controlling the feet driving means, controls a height of the clearance.

According to an aspect, the frame comprises an underface facing the clearance and adapted for contacting the vehicle when moving the robot.

According to an aspect, the robot further comprises an induction charger about the underface.

According to an aspect, the ground interface comprises feet supporting the frame above ground, wherein the feet are distant from each other relative to a first orientation, with the clearance extending between the feet.

According to an aspect, the robot further comprises battery cells powering at least one of the arm, the controller and the sensor, wherein the robot comprises a cabinet extending at least below a center of gravity of the frame about at least one of the feet and housing at least one of the battery cells and the controller.

According to an aspect, the arm comprises at least two segments longitudinally extendable relative to each other, whereby the end effector is able to extend toward the furnace along a straight path.

According to an embodiment, there is provided a system for performing operations using a tool near a high temperature furnace containing molten metal, the system comprising: an Automated Guided Vehicle (AGV) comprising a navigation system controlling displacement of the AGV; and a robot comprising: a frame defining a clearance about which the AGV engages with the robot for displacing the robot along with the AGV; an arm mounted to the frame, the arm comprising an end effector which is adapted for mounting the tool; a controller determining displacement of the end effector along a trajectory, thereby displacing the tool during operations near the high temperature furnace; wherein the AGV and the robot perform their respective operations independently from each other.

According to an aspect, the robot comprises an underface facing the clearance and the AGV comprises a platform contacting the underface for moving the robot.

According to an aspect, the robot and the AGV comprise electrical charge exchange components for exchanging electrical power without contacting each other when the AGV is engaged in the clearance.

According to an aspect, at least one of the robot and the AGV comprises a lifting means for controllably engaging contact between the robot and the AGV.

According to an aspect, the robot comprises a thermo-sensor mounted to the arm about the end effector, wherein the thermo-sensor collects temperature data.

According to an aspect, the robot comprises an image-capturing sensor mounted on the frame distant from the end effector, wherein the image-capturing sensor collects data regarding at least one of a position of the end effector and a content of the furnace.

According to an aspect, the robot comprises feet that are distant from each other relative to a first orientation, with the clearance extending between the feet.

According to an aspect, the robot comprises a sensor for collecting data from at least an area surrounding the arm and the system further comprises battery cells powering at least one of the arm, the controller and the sensor, wherein the robot comprises a cabinet extending at least below a center of gravity of the frame about at least one of the feet and housing at least one of the battery cells and the controller.

According to an aspect, the arm of the robot comprises at least two segments longitudinally extendable relative each other, whereby the end effector is able to extend toward the furnace along a straight path.

According to an embodiment, there is provided a displaceable robot for performing operations using a tool near a high temperature furnace containing molten metal, wherein the robot is displaceable using a vehicle, the robot comprising: a frame having a ground interface for coming into contact with a ground surface while defining a clearance under a portion of the frame for engaging with the vehicle to move the robot about the furnace; an arm mounted to the frame, the arm being capable of displacement about at least two degrees of freedom relative to the frame, the arm comprising an end effector which is adapted for mounting the tool; a sensor for collecting data from at least an area surrounding the arm; and a controller receiving the collected data from the sensor and controlling the operation of at least the arm based on the collected data; wherein the contact with the ground surface is not a rolling contact (i.e., the frame must be lifted in order to displace the robot or the ground interface must not be in contact with the ground in order to displace the robot).

According to an embodiment, there is provided a system for performing operations using a tool near a high temperature furnace containing molten metal, the system comprising: an Automated Guided Vehicle (AGV) comprising a navigation system controlling displacement of the AGV; and a robot comprising: a frame defining a clearance about which the AGV engages with the robot for moving the robot along with the AGV; an arm mounted to the frame, the arm being capable of displacement about at least two degrees of freedom relative to the frame, the arm comprising an end effector which is adapted for mounting the tool; a controller determining displacement of the arm relative to the at least two degrees of freedom; wherein the AGV and the robot perform their respective movements independently from each other.

According to an embodiment, there is provided a displaceable robot for performing operations near a high temperature furnace containing molten metal, wherein the robot is displaceable using a vehicle, the robot comprising: a frame with a clearance being defined under the frame for engaging with the vehicle to move the robot about the furnace; a sensor collecting data; an arm mounted to the frame, the arm being capable of displacement about a plurality of degrees of freedom relative to the frame, the arm comprising an end effector with a tool being mountable to the end effector; a controller comprising a processor receiving the collected data from the sensor and determining displacement of the arm relative to its degrees of freedom; and battery cells powering at least one of the arm, the controller and the sensor, wherein the robot, under control of the controller, performs the operations over the furnace during which the tool mounted to the end effector being outside the furnace and the tool mounted to the end effector operating inside the furnace.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature and not as restrictive and the full scope of the subject matter is set forth in the claims.

BRIEF DESCRIPTION OF THE DRAWINGS

FIG. 5 to FIG. 12 are schematic perspective views of a furnace system in a foundry comprising the robot of FIGS. 1 to 3 and the AGV of FIG. 4 during operation according to a typical cycle operation in the foundry, wherein:

FIG. 5 is a schematic perspective view of the foundry with the AGV transporting bins to the front of a furnace; the bins are used to collect the skim from the liquid metal on the surface.

FIG. 6 is a schematic perspective view of the foundry with the AGV dropping off the bins at the font of the furnace;

FIG. 7 is a schematic perspective view of the foundry during a displacement of the robot and an automated guided vehicle;

FIG. 8 is a schematic perspective view of the foundry with the AGV when about to drop off the robot at the font of the furnace;

FIG. 9 is a schematic perspective view of the foundry with the AGV once dropped by the robot at the font of the furnace, the robot being displaced to a temporary location;

FIG. 10 is a schematic perspective view of the foundry with the robot having a shovel tool mounted thereto during skimming operation inside the furnace;

FIG. 11 is a schematic perspective view of the foundry with the AGV transporting the robot to a temporary location;

FIG. 12 is a schematic perspective view of the foundry with the AGV having transported a bin from the front of a furnace to the front of a second furnace and having dropped the robot at a temporary location;

It will be noted that throughout the appended drawings, like features are identified by like reference numerals.

DETAILED DESCRIPTION

The realizations will now be described more fully hereinafter with reference to the accompanying figures, in which realizations are illustrated. The foregoing may, however, be embodied in many different forms and should not be construed as limited to the illustrated realizations set forth herein.

With respect to the present description, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values and of values herein or on the drawings are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described realizations. The use of any and all examples, or exemplary language ("e.g.," "such as," or the like) provided herein, is intended merely to better illuminate the exemplary realizations and does not pose a limitation on the scope of the realizations. No language in the specification should be construed as indicating any unclaimed element as essential to the practice of the realizations.

In the following description, it is understood that terms such as "first", "second", "top", "bottom", "above", "below", and the like, are words of convenience and are not to be construed as limiting terms.

The terms "top", "up", "upper", "bottom", "lower", "down", "vertical", "horizontal", "interior" and "exterior" and the like are intended to be construed in their normal meaning in relation with normal installation of the product.

Figure 1:
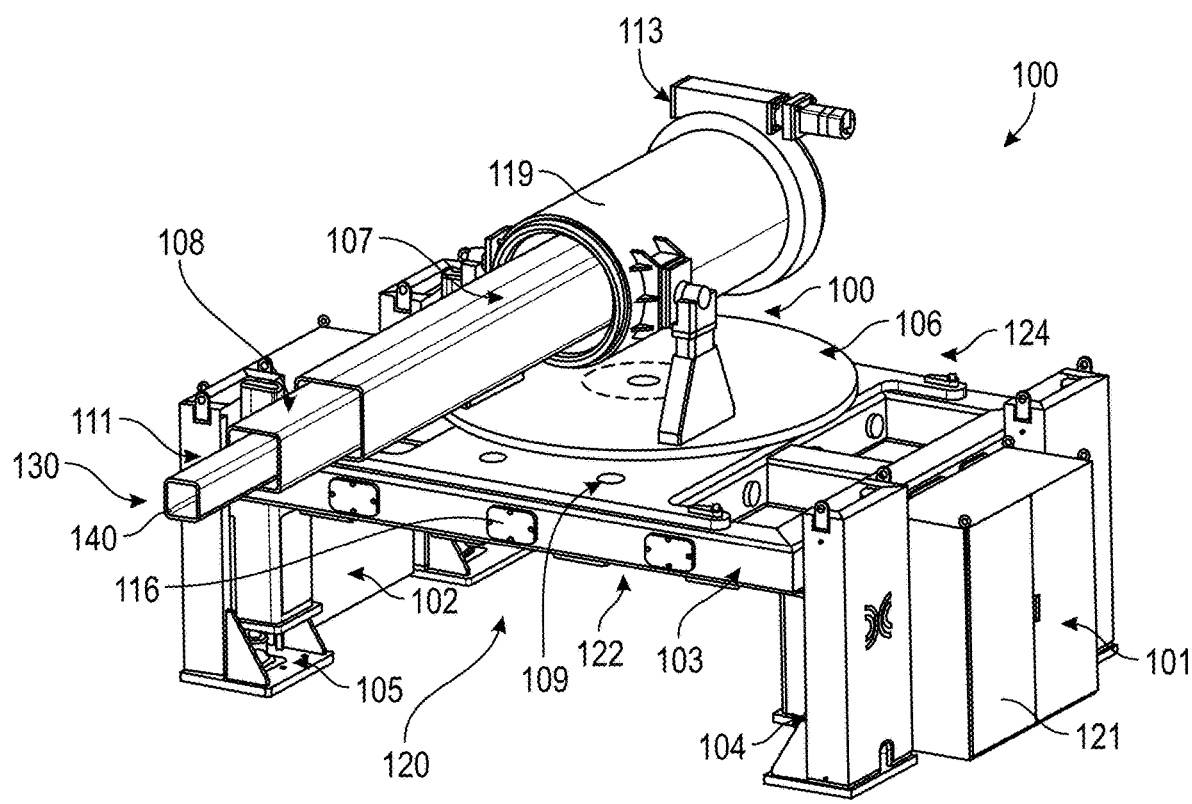
FIG. 1 is a perspective front view of the robot used to perform operations in the furnace according to an embodiment.
Figure 2:
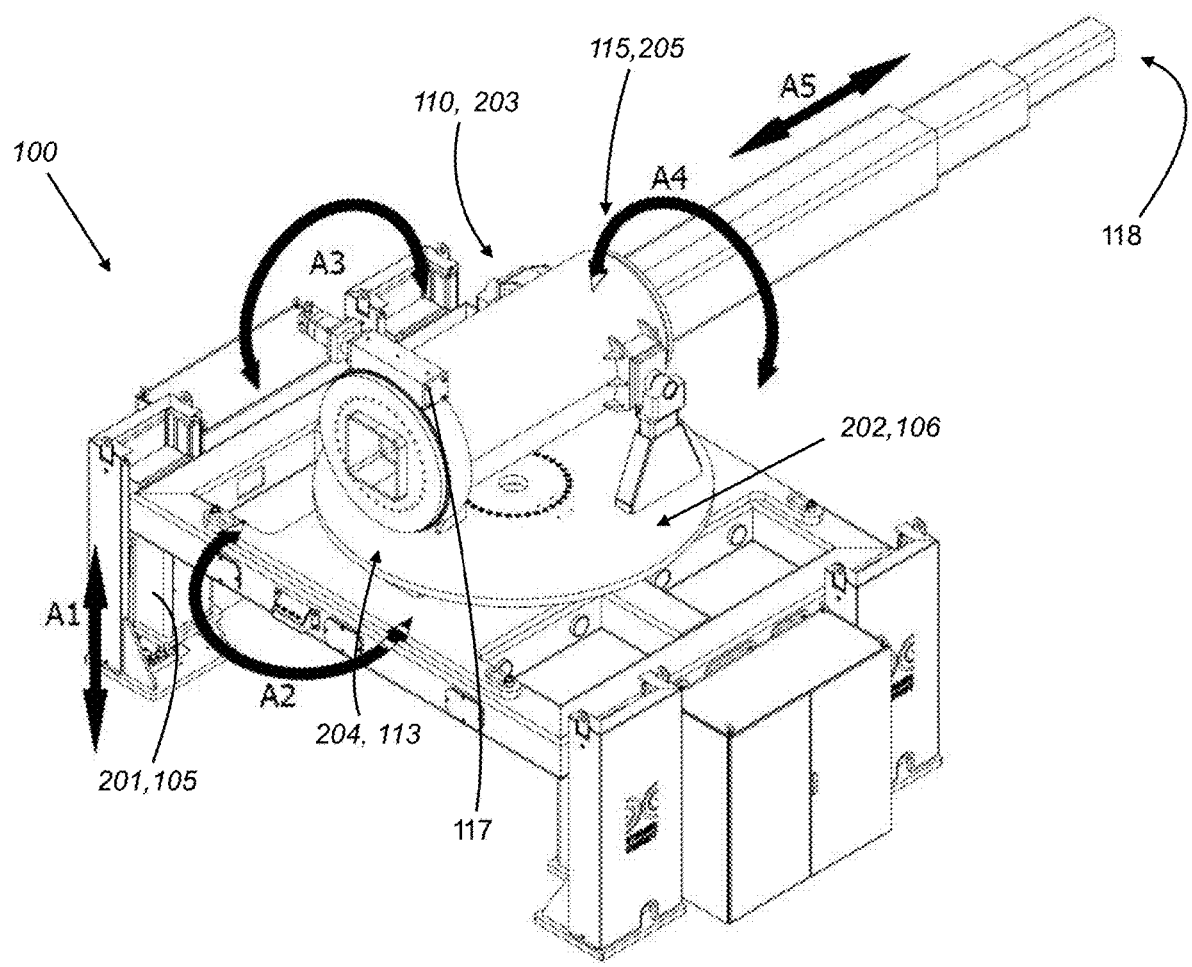
FIG. 2 is a perspective back view of the robot of FIG. 1 which schematically illustrates different axes of rotation of the robot and/or components of the robot, thereby illustrating the degrees of freedom associated with the robot.

Referring now to FIGS. 1 and 2, an automated robot 100 comprises a controller 101 and a power source 102. The robot 100 is adapted to perform operations autonomously in the foundry, and more precisely in the furnaces such as furnaces 552 and 553 (see FIG. 12). The robot 100 includes five driven axes (PRRRP) with two prismatic joints (displacement axes A1 and A5) and three rotatory joints (rotational axes A2, A3 and A4).

Figure 3:
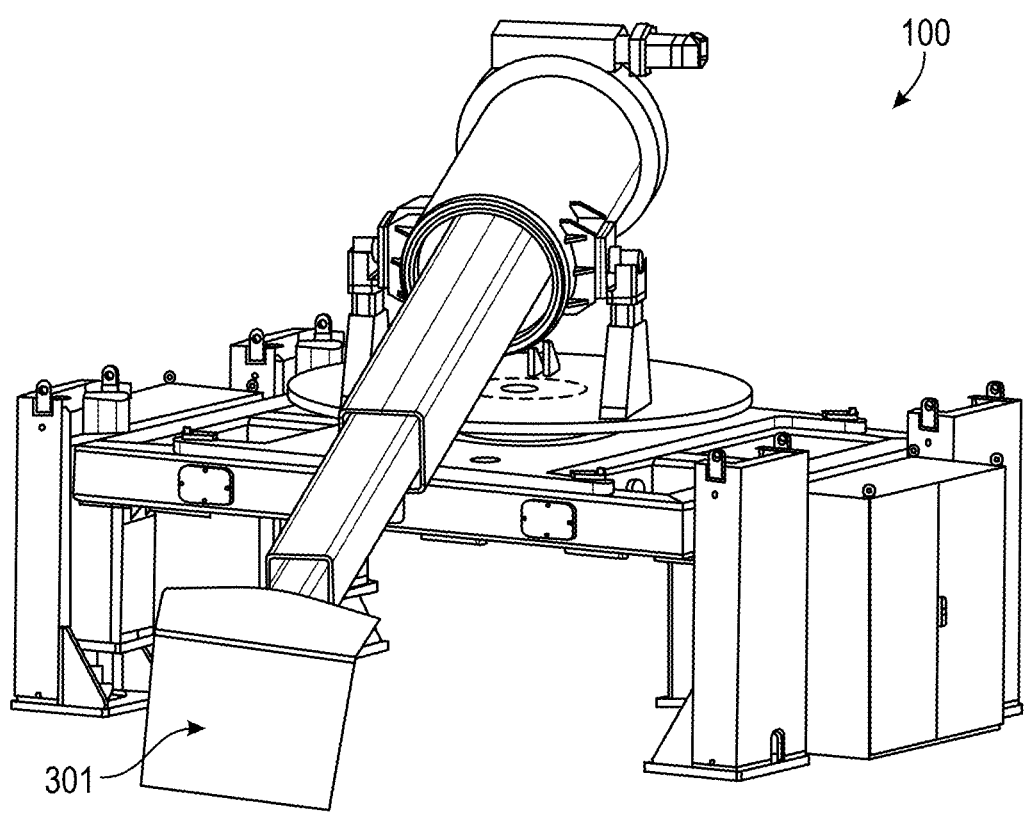
FIG. 3 is a perspective front view of the robot of FIGS. 1 and 2 with a tool mounted on the robot end-effector for skimming operations in a furnace.

Referring now additionally to FIG. 3. The robot 100 is mounted to a pedestal 120 comprising a platform 103 and feet comprising legs 104. The pedestal 120 comprises four legs 104 located on the four corners of the platform 103, ensuring stability of the pedestal 120 when on the ground. The legs 104 are of a length and are distant enough width-wise to provide a width clearance thereunder for an automated guided vehicle AGV 150 (see FIG. 4) such that a platform 401 enters under the pedestal 120. Furthermore, the legs 104 are distant enough depth-wise to locate on each side between the pairs of legs 104 a side cabinet 121 housing a component of the robot 100. The side cabinets 121 are located about the ground and thereby lowering the center of mass of the robot 100 for improved stability. Such improved or optimized stability is useful in the displacement of the robot 100 as in the extent of operation of the robot 100.

One of the side cabinet 121 houses the power source 102 of the robot 100 that comprises rechargeable battery cells (not shown). The other one of the side cabinets 121 houses a controller 101 comprising a central processing unit, aka processor, (not shown) and other hardware involved in controlling the operations of the robot 100.

In realizations, the side cabinets may house additional heavy-weight components, components which do not need to be mounted about the mobile portion of the robot 100 (e.g., cooling components), or heat-sensitive components. Such configuration maintains optimization of the stability of the robot 100.

The platform 103 has an underface 122 comprising locations for engaging with the AGV 150 when the AGV 150 engages under the platform 103 for lifting the robot 100.

The platform 103 is designed to substantially correspond to the dimensions of the platform 401 of the AGV 150 to support the weight of the robot 100 to be lifted, and to ensure stability of the combination platform 103—AGV 150 during displacement.

A first driving assembly 201, aka feet lifting means, operating according to axis A1, controls the elevation of the platform 103, thus vertical translation of the platform 103 relative to the ground. The first driving assembly 201 comprises four actuators 105 situated inside the four legs 104 of the pedestal 120, one in each leg 104. These actuators 105 are activated and controlled at the same time in order to position vertically the top portion of the robot 100. However, these four actuators 105 may also be actuated independently in some cases to balance the platform 103 using an inclinometer 109 situated in platform 103 as input of the controller 101.

A second driving assembly 202, operating according to axis A2, allows rotation of, typically, one hundred and eighty degrees (180°) of rotation of the mounted components. The second driving assembly 202 comprises one driving actuator 106 driving its rotation angle.

A third driving assembly 203, operating according to axis A3, comprises at least one driving actuator 110 driving angular orientation of the telescopic arm 130.

The fourth driving assembly 204 and fifth driving assembly 205, comprising respectively a rotating actuator 113 and a longitudinal actuator 115, operate according to axes A4 and A5, and drive respectively the spinning of the telescopic arm 130 and the translation of the end effector 140 of the telescopic arm 130 and thus the length of the telescopic arm 130. The rotational driving actuator 113 of the fourth driving assembly 204 is mounted to interface between a casing 119 and the telescopic arm 130.

The telescopic arm 130 comprises three segments 107, 108 and 111, with the first segment 107 having a fixed longitudinal position and two retractable segments, segment 108 and segment 111. The actuator 115 of the fifth driving assembly 205 operates on the second segment 108 and the third segment 111 to displace them linearly and thus control the length of the telescopic arm 130 and longitudinal displacement of the end effector 140 along a straight path. The robot 100 is adapted to simultaneously control some of the driving assemblies 201-205, and more particularly at least two of the third driving assembly 203, the fourth driving assembly 204 and the fifth driving assembly 205 in order for the telescopic arm 130 to perform complex operations involving changes in orientation and location of the end effector 140.

The different driven axes are illustrated in the FIG. 3 which A1 is prismatic joint, which provides a linear sliding movement, of the first driving assembly; A2, A3 and A4 are respectively axes of rotation associated with the second, the third and the fourth driving assemblies 202-204, and A5 is prismatic of the fifth driving assembly 205.

Referring particularly now to FIG. 3, it illustrates a robot 100 with tool 301 attached in the end effector 140. As depicted, the tool 301 is a shovel that is used inside the furnace 552, 553 (FIG. 12) for skimming operation. Mainly, for normal operations, two different tools are used, one for skimming or one for scraping. According to the operation, the robot 100 can mount autonomously any one of these two different tools to the end effector 140.

The end effector 140 having a tool 301 mounted thereto is therefore adapted to perform two types of operations with associated movement requirements: translation in order to move the tool according to a desired course, and rotation for making the tool spin and to rub against a surface through an angular movement or to make the tool operate according to a reciprocating angular movement.

According to a realization, the end effector 140 of the robot 100 comprises a tool locking mechanism (not shown) adapted to hold and release the tool 301 on demand. According to a realization, the tool locking mechanism is located in the telescopic arm 130, using a coupling component (not shown) which is for attaching the tool to the telescopic arm and thus a change of configuration. The coupling component of the telescopic arm 130 toggles the locking mechanism between a locked configuration and an unlocked configuration. The tool locking mechanism comprises a pneumatic jack (not shown) for a quick coupling and decoupling of the tool 301 at the end effector 140. A double acting jack (not shown) allows to push a cylindrical gear (not shown) having teeth that are engraved on the axis of the cylinder, for coupling and decoupling.

The automated robot 100 further comprises a plurality of sensors collecting data before operations and during operations of the robot 100. The sensors comprise exteroceptive sensor, i.e. an image-capturing sensor 116, for example one or more cameras that collects images of the telescopic arm 130, of the end effector 140, of the tool 301 when mounted to the telescopic arm 130, and of the environment comprising the furnace 552, 553 and the content of the furnace 552, 553, namely the surface of molten metal on which the tool 301 operates. The sensors further comprise an inclinometer 109 mounted to the platform 103 or to a component of the robot 100 that should not move during operations. Optionally, the sensors may comprise additional inclinometers (not shown) mounted on moving components (e.g. telescopic arm 130) providing additional information that are processed with the captures images to control the telescopic arm 130. The sensors further comprise encoders (e.g. encoder 117) associated with at least part, and typically to each of the driving assemblies 201-205, wherein the encoders provide data on operations of the driving assemblies 201-205, for instance position, speed, torque, etc. The sensors further comprise proprioceptive sensor, i.e. a temperature sensor 118 as will be discussed hereinafter.

Figure 24:
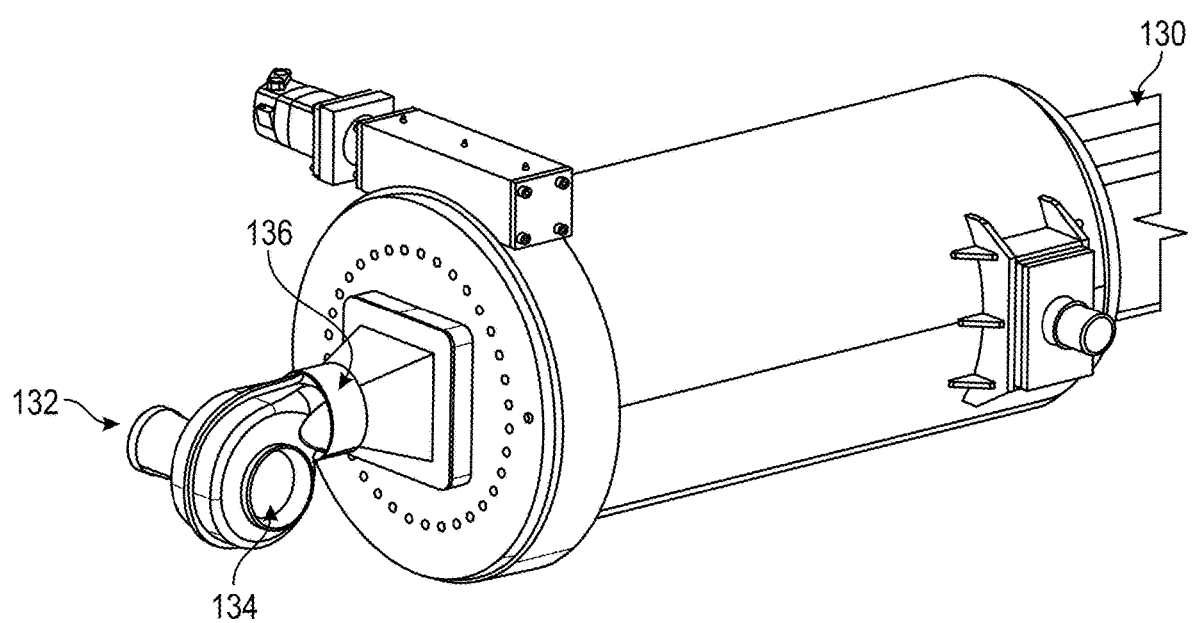
FIG. 24 is a perspective view of a portion of the telescopic arm of the robot of FIGS. 1-3 depicting components of the cooling system.
Figure 25:
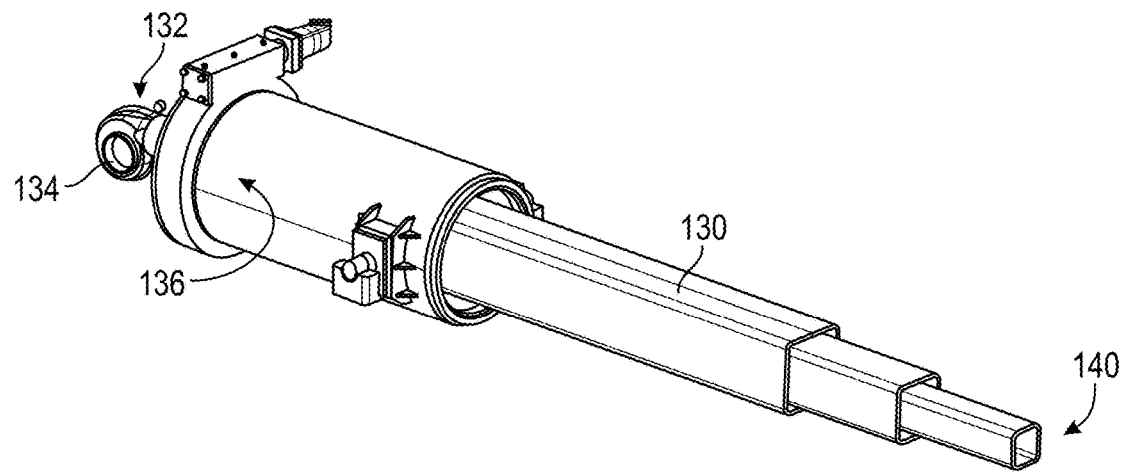
FIGS. 25 and 26 are front and rear perspective views of the telescopic arm of FIGS. 1-3 and FIG. 24.
Figure 26:
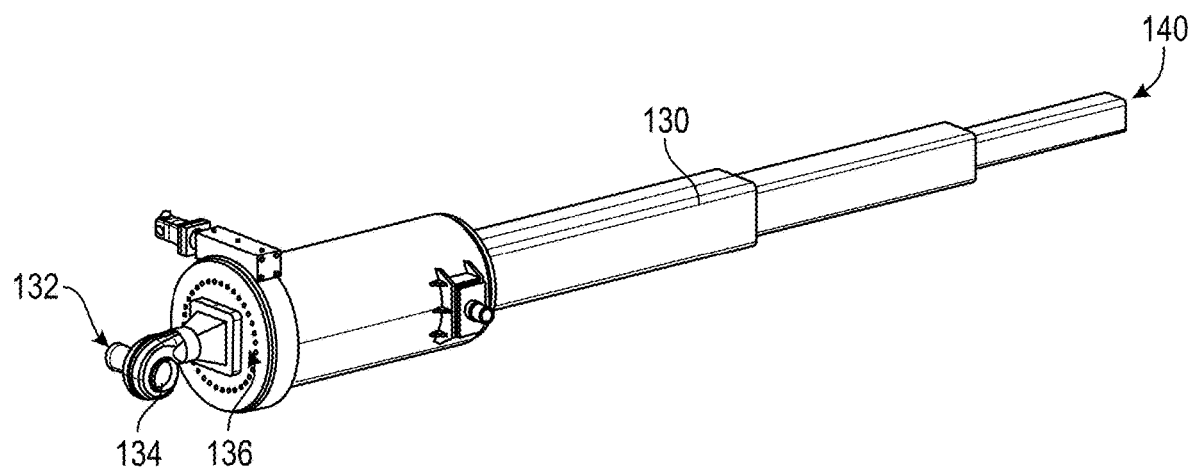

Referring now additionally to FIGS. 24 to 26, the automated robot 100 further comprises a cooling system æ for cooling down sensitive components of the robot 100 operating in a high temperature environment or subject to overheating. The cooling system (not shown) includes a fan, ducting, valves and a plurality of vortex coolers generating air vortexes about the components to be cooled down. Among the to-be-cooled-down components are at least some of the controller 101, the power source 102, sensors 109, 116-118 and a coupling component.

FIGS. 24 to 26 depict components of the cooling system adapted to cool down the telescopic arm 130 with air flowing through the telescopic arm 130 from its end about the platform 103 towards the end effector 140. This sub-system of the cooling system comprises an air inlet 134, a fan 136 and a vortex cooler 138 situated downwards with respect to the flow of air in the sub-system.

According to realization, the cooling system may comprise a pressurized air subsystem (not shown) that is connected to the cooling system.

According to a realization, the cooling system comprises air-based components with the objective of cooling down components using air, and more precisely compressed air.

Additional components of the cooling system include thermic deflectors mounted about heat-sensible components between the components and the furnace 552, 553, comprising thermal protections and insulation applied to motors and driving components. The cooling system may include a fluid-based cooling system dedicated to electronic components such as the controller 410, and electrical components such as the battery cells of the power source 102; with these sensible components being typically located in the side cabinets 121. Additional fans to force air circulation in relation with components such as battery cells may be used. The cooling system may further comprise a motorized thermal deflector (not shown) mounted to the platform 103 to protect the camera 116. Once again, each of the thermal deflector and the motors may have associated fans based on design parameters and physical locations of these components to control the temperature in which these components operate.

The power source 102 of the robot 100 includes rechargeable battery cells (not shown). The robot 100 charges autonomously using an induction charger 124 located about the underface of the platform 103.

The batteries cells are adapted to provide an electrical charge during the furnace operations.

According to a realization, the robot 100 determines beforehand an operation the current charge level and determines the charge level required for the operation. Based on these results, the robot 100 determines the optimal time for a charge.

According to a realization, the induction charger 124 of the robot 100 is adapted for operating electrical charge exchanges between the robot 100 and the AGV 150 when the robot 100 is lifted by the AGV 150. Accordingly, the AGV 150 is adapted to provide power to the robot 100 whenever the robot 100 is displaced or ready to be displaced.

Figure 4:
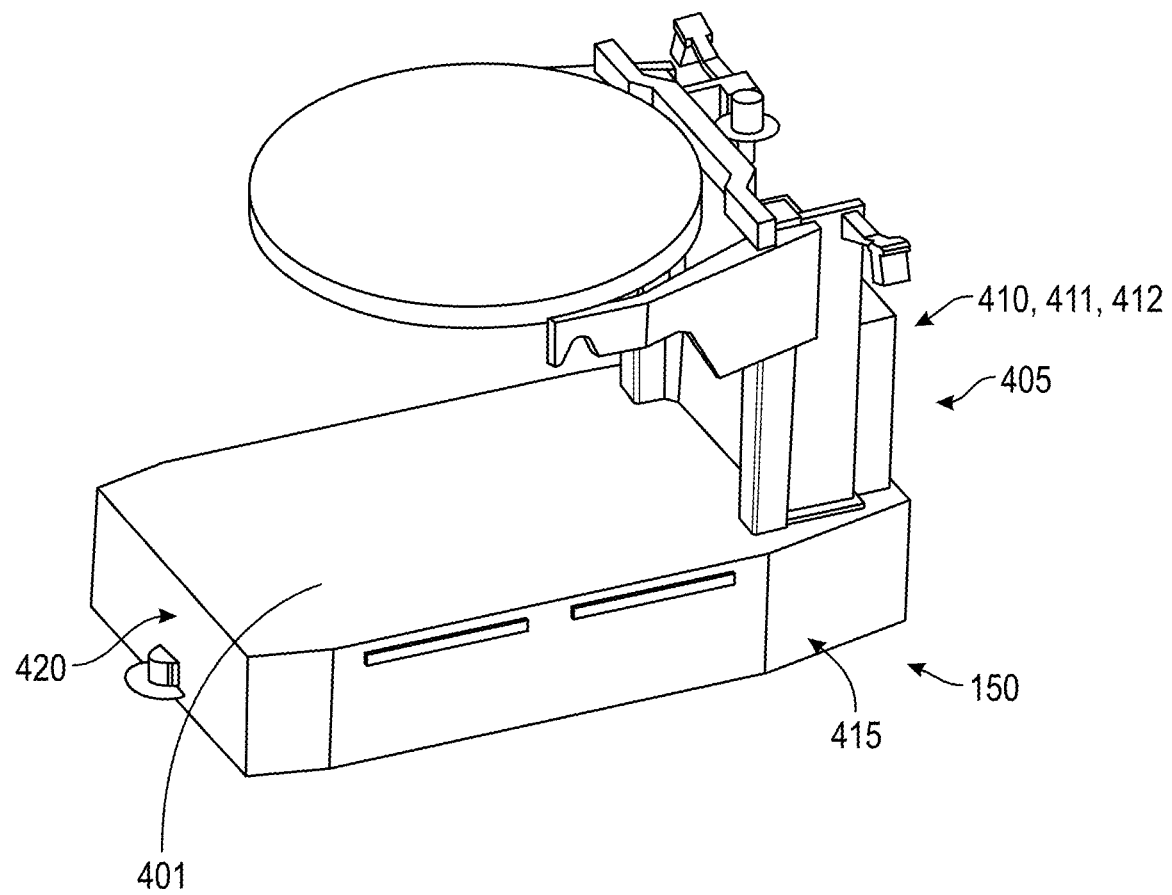
FIG. 4 is a perspective view of an Automated Guided Vehicle (AGV) adapted to move the robot of FIGS. 1 to 3.

Referring now particularly to FIG. 4, the system for automatization of operations in a foundry comprises an AGV 150. The AGV 150 operates as an autonomous vehicle including a power source 102 and a controller 101 operating according to software for performing autonomously operations. The AGV 150 further comprises a wireless controller (not shown) for exchanging signals, with the AGV 150 being further adapted for performing operations upon reception of wireless command signals from a system controller. The wireless command signals are indicative to a certain degree, varying from initiation command signals to full processing command signals, of such operations to be performed.

The AGV 150 further comprises engaging components. In the present depicted example, the AGV 150 comprises case wheels (not shown) mounted to a frame (not shown) for engaging with the ground for displacement of the AGV 150 in the foundry. The AGV 150 comprises, in addition to the case wheels or additional ground engaging components, steering components (not shown), e.g., steered wheels, capable of driving the AGV 150 in the forward direction, in the backward direction, and for steering the AGV 150.

According to a realization, the AGV 150 determines its position according to a natural detection process. In other words, the AGV 150, comprising a scanner 405, scans the foundry environment, with the controller processing the data resulting the scanning process and constructing a virtual map of the foundry environment. During operation, the controller 410 of the AGV 150 uses the virtual map to guide its displacements.

According to alternative realizations, the AGV 150 may comprises one or more of optical sensors for detecting obstacles and known visual references or beacons (optical or not) for guided displacements, near-field detection sensors, laser sensors, magnetic field detection sensors or a combination of the above to efficiently travel among devices and obstacles present in the foundry environment. Thereby, the AGV 150 operates using the sensor data to feed a detection and collision avoidance system 412 adapted to respond in real time to changes in the environment. Contemplated methods of navigation comprise navigation based on virtual environment mapping, navigation based on beacon recognition such as reflectors, barcode stickers, spots, navigation based on magnetic field detection, navigation based on inductive wire guidance.

Therefore, in light of the contemplated technologies, the controller 410 of the AGV 150 comprises a navigation system 411 computing trajectories based on stored parameters, and on at least one of sensor data and signals from an environmental system comprising sensors monitoring the environment in which the AGV 150 operates.

The power source 102 of the AGV 150 includes rechargeable battery cells. The controller 410 of the AGV 150 comprises a charge detector able to detect the remaining charge of the battery cells, and to determine when and how to move to a charging station (not shown) upon detection of the remaining charge level being depleted under a preset value based on current operation and location. The AGV 150 is thereby also able to determine beforehand the charge level required for the operation without hindering of delaying unnecessarily the realization of operations in the foundry.

According to a realization, the AGV 150 may be manually connected by an operator using a charging cable to connect to a cable-connection charger (not shown) when at the charging station to recharge. According to a realization, the AGV 150 comprises an induction charger 415 and the AGV 150 can autonomously initiate a charging operation of its battery cells by taking place above an induction-based charging platform. According to an embodiment, the manual charging is required in some circumstances such as initial charging, fast charging operation, programmed maintenance requirements, maintenance operations and initiation of an autonomous operation cycle. It is worth noting that in the case when an AGV 150 comprises both a cable-connection charger and an induction charger 415, mandatory times to use the cable-connection charger may be based on software restrictions for security reasons or maintenance reasons.

It is worth noting that the herein description depicts the robot 100 comprising a raise-controllable platform 103. In order to lift the robot 100 from the ground, or in other word disengage the robot 100 from the ground, one solution consists in having the AGV 150 engaging under the platform 103 of the robot 100, having the robot 100 shortening the legs 104 until the platform 103 of the robot 100 lays on the platform 401 of AGV 150 and the end of the legs 104 are at a safe distance from the ground. Thus, at this time, the AGV 150 may safely displace the robot 100.

In other realizations, the AGV 150 may comprises controllable lifting means for lifting the platform 401 of the AGV 150 between a low position and a raised position, the low position allowing to freely engage and disengage the platform 401 of the AGV 150 in and out from under the platform 103 of the robot 100. In other realizations, the raised position, the top of the platform 401 would contact the underface 122 of the platform 103, disengaging contact between the legs 104 and the ground. In other realizations, for operating reasons, both of the robot 100 and the AGV 150 may have raising capability, with the AGV 150 and the robot 100 synchronizing operations when performing raising and landing operations as displacement operations.

Accordingly, in the context of the present description, the expression "lifting up" and other similar expressions in relation with the displacement of the robot 100 should be construed in a process through which the robot 100 ceases to contact the ground and is thereby free to be displaced safely.

It is further worth noting that the processes herein described in relation with charging the AGV 150 also apply to the robot 100. Accordingly, even though the robot 100 is adapted to charge away from a charging stations, the robot 100 may also be charged at a charging station when required; the required conditions to charge at a charging stations being similar to the ones relative to the AGV 150. In order to charge at a charging station, the robot 100 would be displaced to a charging by the AGV 150.

Figure 5:
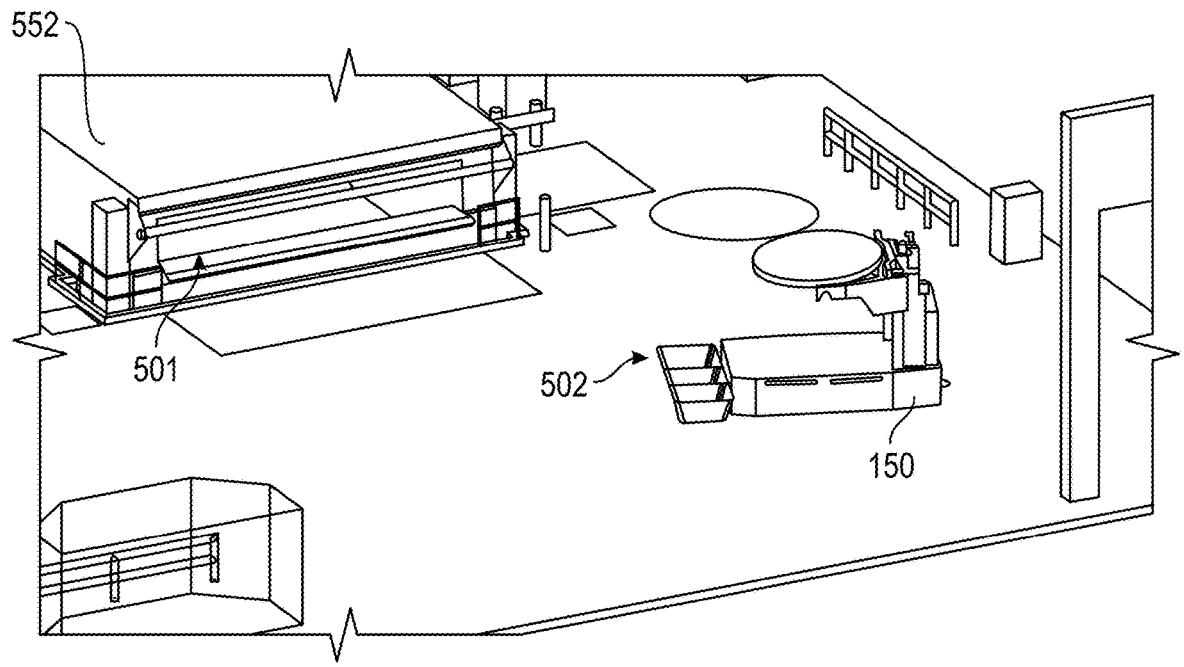
Figure 6:
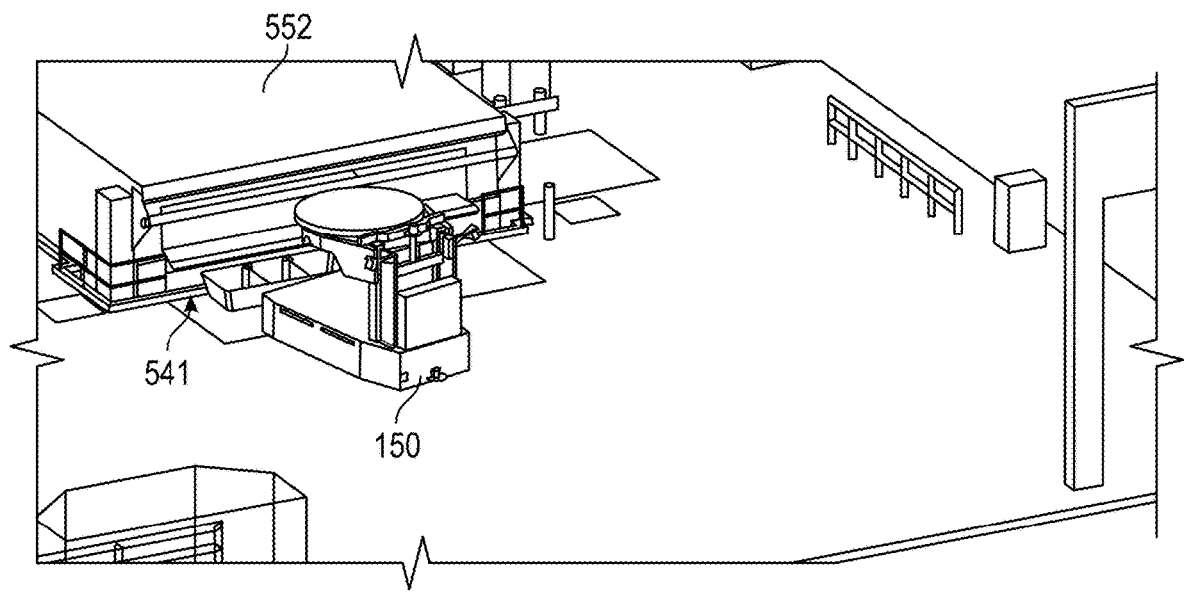

Referring now additionally to FIGS. 5 to 12. Operations in the foundry start with displacement of a bin 502 as illustrated in FIG. 5. The AGV 150 comprises front handling component 420, e.g., a magnetic holder or a pair of forks, to pick up the bin 502 and transport the bin 502 to the front of the furnace 501. This bin 502 is used to collect skim from furnace 501. Once at the correct location, the AGV 150 drops off the bin 502 at the front door 541 of the furnace as shown in FIG. 6. According to a realization, as illustrated, a plurality of bins 502, e.g., two (2) bins 502, may be moved and dropped off at this location using a single AGV 150, the bins being moved one after the other.

In order to perform skimming operations and the like, the robot 100 comprises image-capturing sensors 116, a.k.a. cameras 116, collecting information regarding the liquid metal contained in the furnace 552 before and during interaction of the tool 301 with the liquid metal. Such cameras 116 are typically mounted to platform 103, but may alternatively or additionally be mounted to the telescopic arm 130 and/or about the casing or the telescopic arm 130. In normal operation, the cameras 116 collects data, such as images either in or not in the visible spectrum, with the controller 101 processing the collected data and generating commands used to guide the operation of the tool 301 in the furnace 552. Operation of the tool 301 may for instance take the form of determination of sequences of cartesian coordinates the tool 301 should follow, with these cartesian coordinates being translated by the controller 101 in commands for each of the five driving assemblies 201-205 for the end effector 140 to follow a trajectory, i.e. a trajectory that is not mandatorily linear, according to trajectory set points set by the controller 101.

Further, a temperature sensor 118, e.g., a thermocouple, is located about the end effector 140 of the telescopic arm 130. The temperature sensor 118 collects temperature data used by the controller 101 to establish movements and operation duration of the tool telescopic arm 130 to prevent premature wear. According to a realization (not shown), at least two temperature sensors 118 are mounted at different location along the length of the telescopic arm 130, the data collected by the temperature sensors 118 being used to interpolate and extrapolate temperature of particular components, such as the extremity of the tool 301, and joint components linking segments 107, 108 and 111 of the telescopic arm 130.

Figure 7:
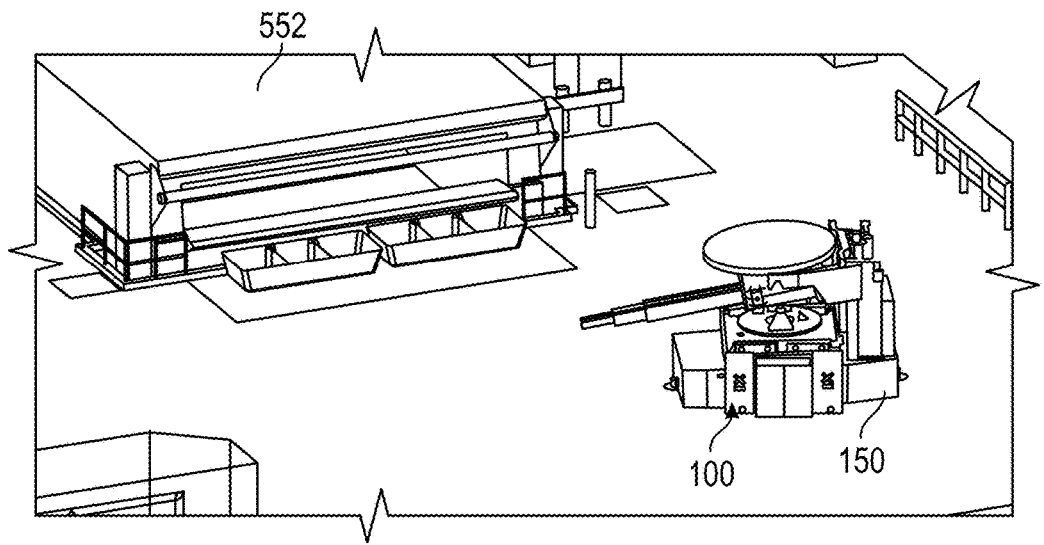
Figure 8:
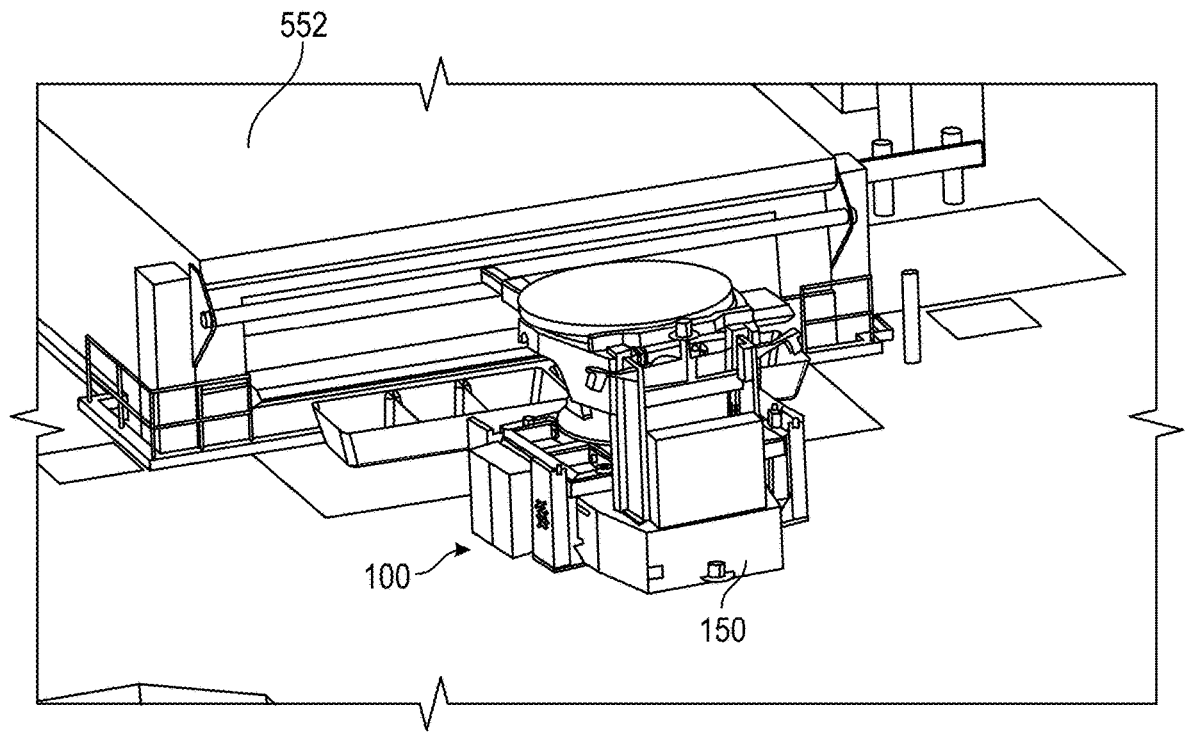
Figure 9:
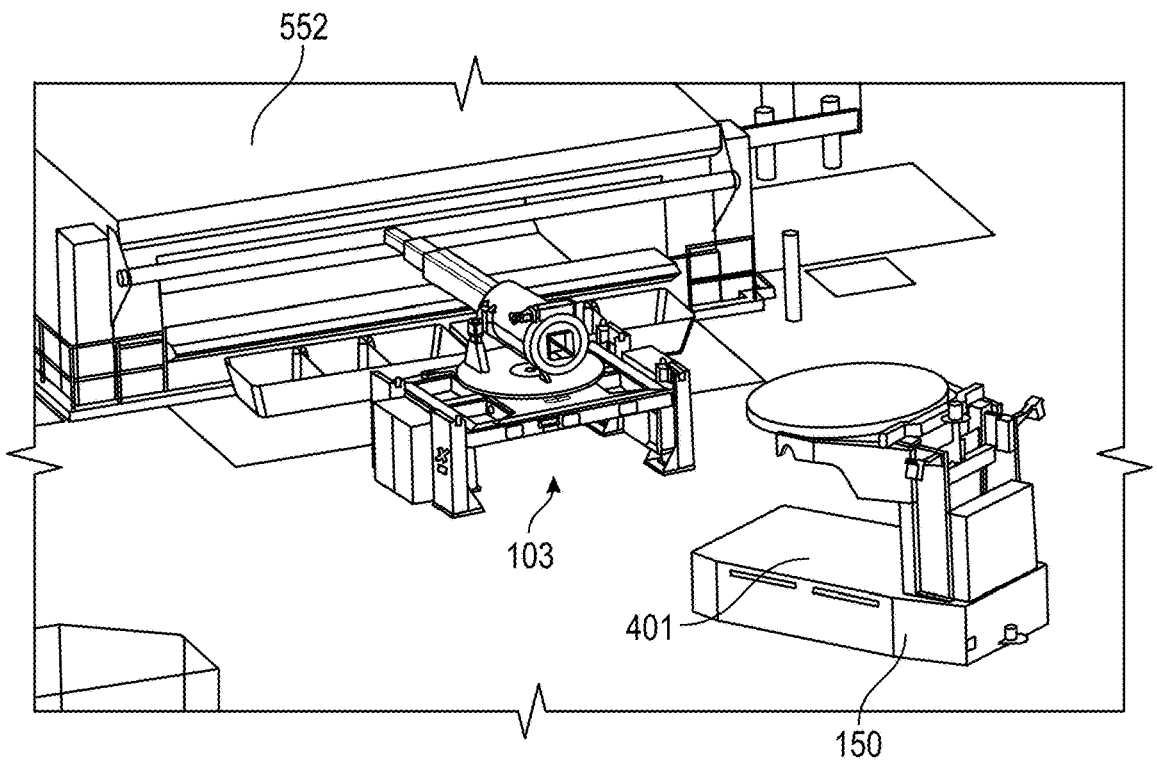

Referring to the FIG. 7, the AGV 150, once having moved under the platform 103 of the robot 100, lifts the robot 100 and moves the robot 100 from a pick-up location to a central location relative to the furnace 552 about the furnace front door 541. The AGV 150 then drops off the robot 100 as illustrated at FIG. 8. The robot 100, located about the furnace front door 541 is then ready to start the skimming operation. Once the robot 100 is dropped off, the AGV 150 moves at a temporary location that is at a distance from the robot 100 (see FIG. 9).

Figure 10:
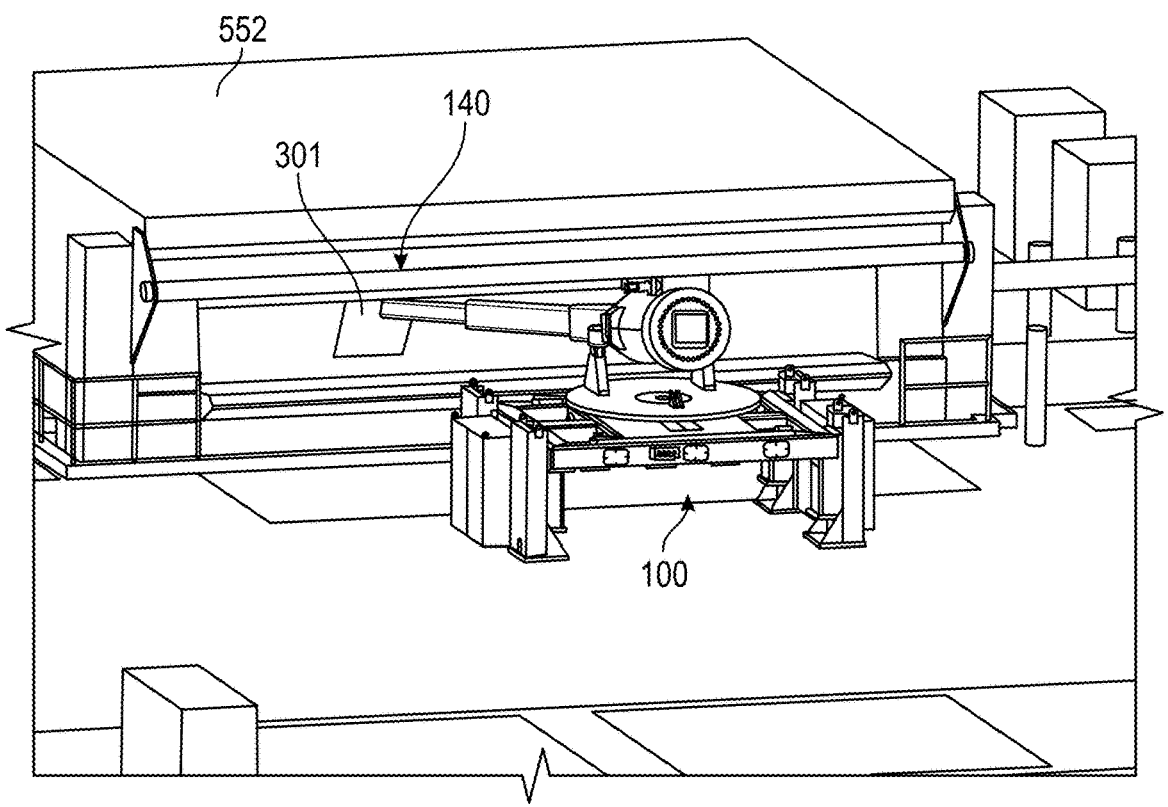

Referring now additionally to FIG. 10. A vision system, based on an image-capturing sensor 116, that is mounted to the platform 103 is adapted to capture images of the liquid metal in the furnace 552, and to analyze the images of liquid metal to determine the presence and locations of skim on the surface of the liquid metal. After the initialization of operating parameters, the skimming operation begins with trajectories computation. A trajectory generation procedure is performed in the controller 101 of the robot 100 in order to follow a specific path. FIG. 10 shows end effector 140 of the robot 100, with the tool 301 mounted thereto, moving the tool 301 in the furnace 552 to remove skim from the furnace 1200. The procedure consists in collect, aka raking, skim on the surface and bring the skim to the bins 502 (as shown on FIG. 9) using the tool 301. The telescopic arm 130 is extended in order for the tool 301 to reach the back of the furnace 552. Orientation according to the fourth axis of the telescopic arm 130 allows to collect the skim on side walls. At the end of skimming operation, the robot 100 changes the mounted tool, i.e. exiting the tool 301 from the furnace 552, unmounting the tool 301 to be left temporarily at an idle location, mounting another tool and directing the end effector 140 of the telescopic arm 130 in the furnace 552, for performing a scraping operation into the furnace.

One must note that the image-capturing sensor 116 is also used for performing calibration of the robot 100, and more precisely movements of the end effector 140. And since the robot 100 is moved between locations frequently, calibration operations must be performed also frequently. The use of robot-embedded vision system accelerates the calibration operations and provides freedom to the robot 100 to perform a calibration operation as soon as any de-calibrating conditions, e.g., shocks, contacts, the telescopic arm being the object of excessive forces, being registered by the robot 100.

After the skimming operation being completed, the AGV 150 comes under the platform 103 and lifts up the robot 100 to be able to displace the robot 100.

It is worth noting that a skimming operation has been herein described as teaching purpose only. It is herein contemplated that other operations such as scrubbing, mixing, and dross collecting operations may be performed by the robot 100, with adapted tool being used for each of these operations.

Figure 11:
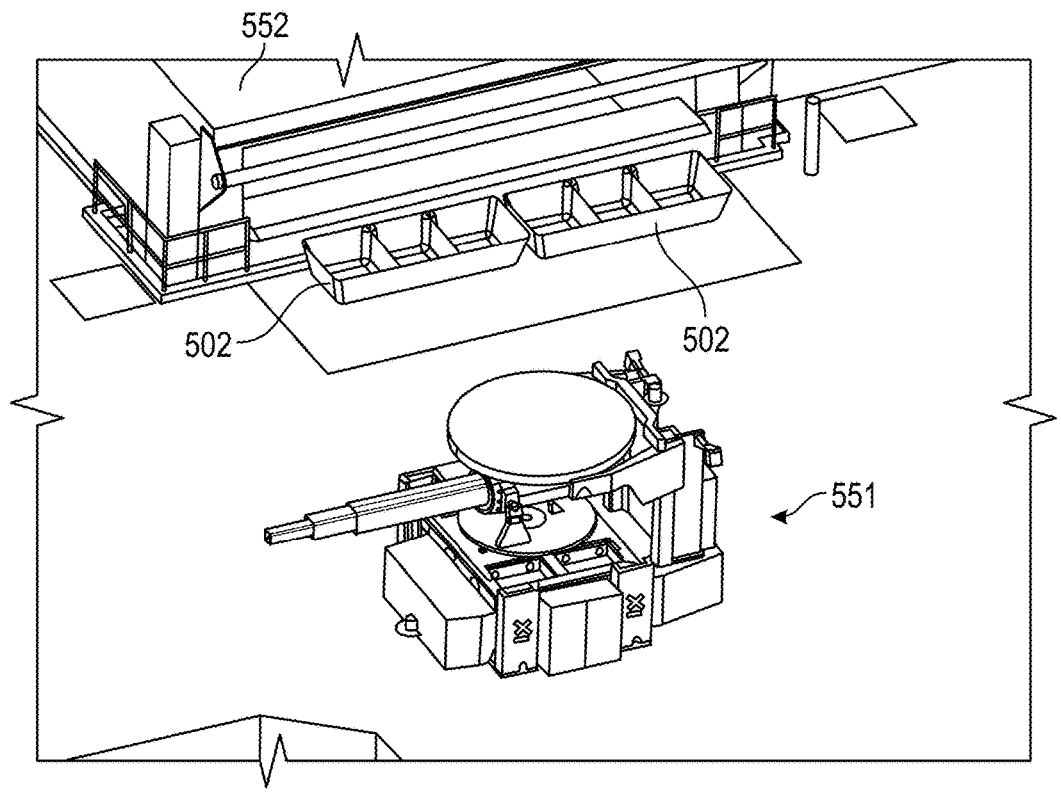

FIG. 11 depicts the AGV 150 with the robot 100 at a temporary location 551 while waiting for a next operation. The AGV 150 drop off the robot 100 at that temporary location 551.

Figure 12:
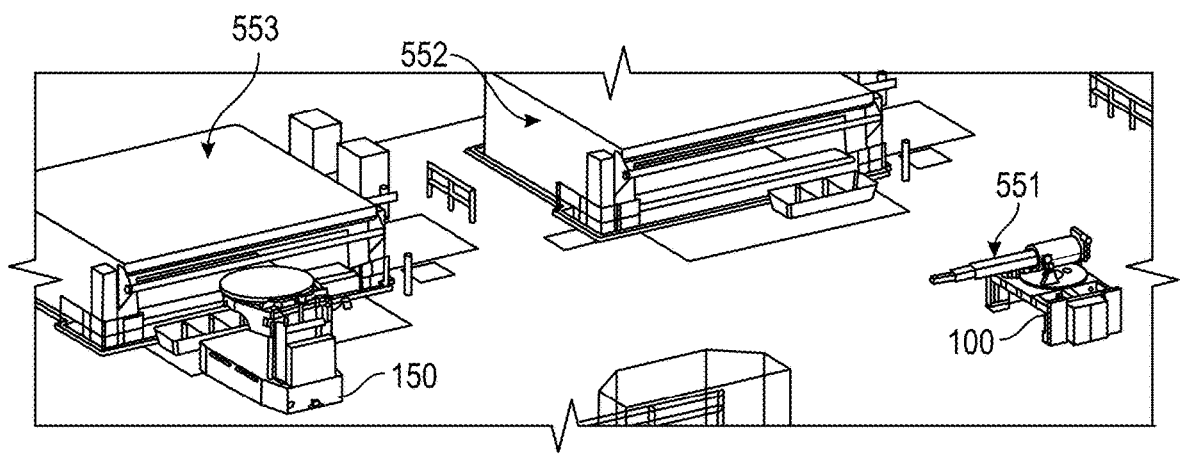

FIG. 12 depicts the AGV 150 in the process of transferring the bins 502 from the front of the first furnace 552 to the front of the second furnace 553.

It must be contemplated that, according to realizations, the robot 100 comprises sensors, wherein the variety of contemplated sensors comprises optical sensors, thermal sensors, radio frequency sensors and/or other sensors. Data collected by the sensors is used to control and/or monitor the operations of the robot 100. The information collected by the sensors are transmitted to and processed by the controller 101, the latter using the data as inputs or parameters in the determination parameters of operation such as movements parameters, movements sequences, and operation durations.

The system is adapted to perform various operations in high temperature such as and without limitation to the preparation and the handling of containers containing alloy metals; the filling and handling of bins including throw-away material; the operation of skimming coolers; various cooling operations in and out of a furnace and mixing operations.

Figure 13:
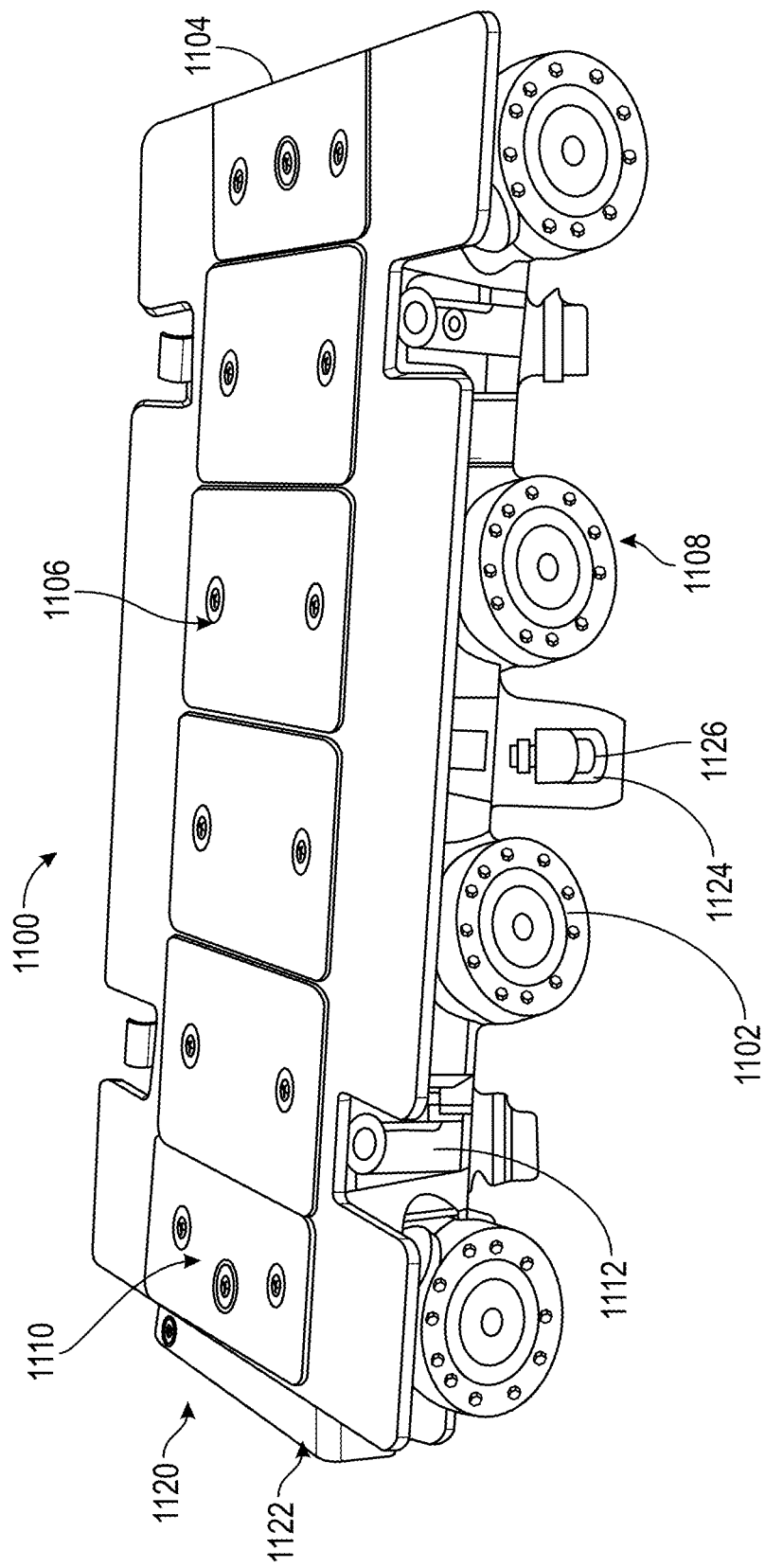
FIG. 13 is a perspective elevation view of an automated guided vehicle part of a system for automation of operation of a foundry in accordance with another embodiment.
Figure 14:
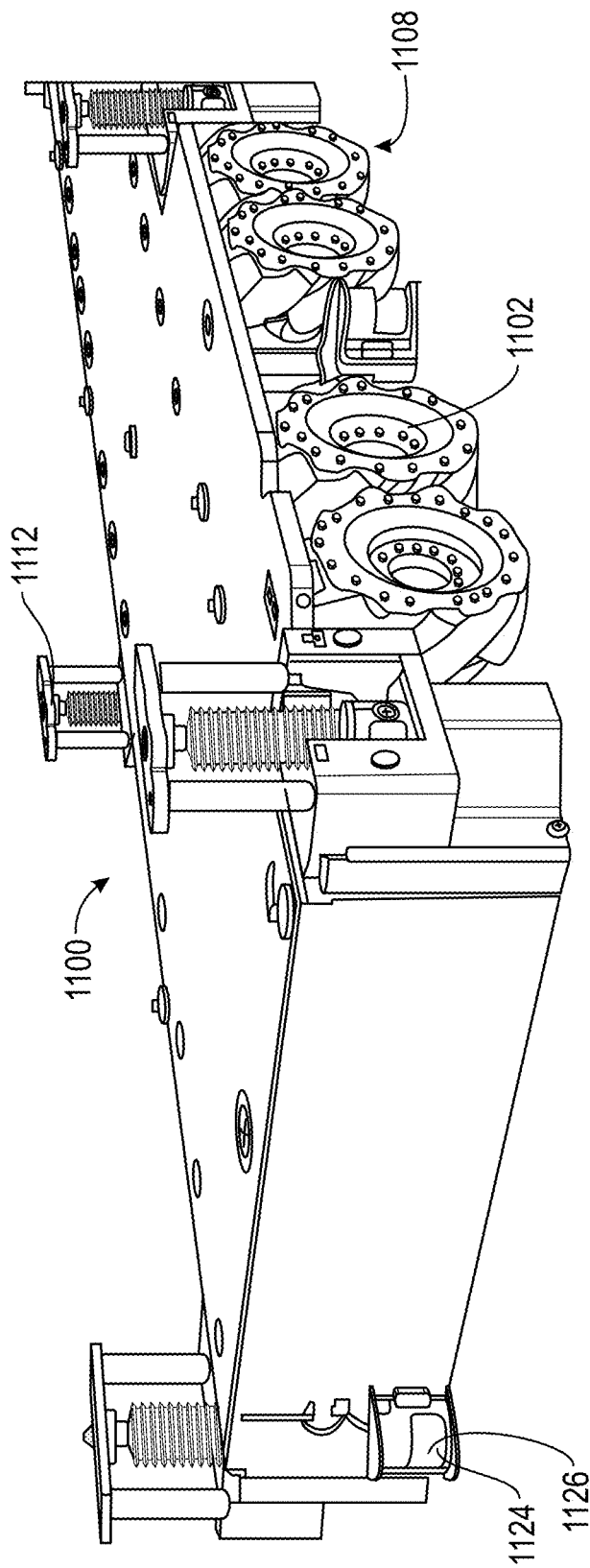
FIG. 14 is a perspective front view of an automated guided vehicle according to another embodiment.

Referring now particularly to FIGS. 13 and 14, the system for automatization of operations in a foundry comprises an automated guided vehicle 1100 (a.k.a. and hereinafter AGV 1100) (embodiments of FIG. 13 and FIG. 14 slightly differing). The AGV 1100 consists in a vehicle comprising controller 1120, power source 1106 and software for performing autonomously operations, or alternatively for performing operations upon reception of wireless command signals from a controller 1270 (see FIG. 17) indicative of such operations. The AGV 1100 comprises a number of engaging components, in the present case wheels 1102 mounted on a frame 1104 for moving the AGV 1100. The AGV 1100 also comprises a power source 1106 and driving component, in this case hydraulic motors 1108 hosted by the wheels 1102 and driving the wheels 1102 in both forward and backward directions. The AGV 1100 also comprises a hydraulic compressor 1110, hydraulic controls (not shown) and connections (not shown) to distribute the hydraulic fluid to the hydraulic components, comprising for movements of the AGV 1100.

The AGV 1100 further comprises hydraulic jacks 1112, in this case four (4) hydraulic jacks 1112, located at distant locations one from the other for lifting a pedestal 1220 (FIG. 16) located above the AGV 1100 when lifted. The hydraulic jacks 1112 are located distant from each other to optimize stability of the pedestal 1220 to be lifted and moved afterwards.

The AGV 1100 further comprises a controller 1120, a communication device 1122 operating under control of the controller 1120, and sensors 1124 communicating with the controller 1120.

According to embodiments, the sensors 1124 comprises optical sensors 1126 for detecting obstacles and known visual references or beacons (optical or not) for guided displacements. According to embodiments, the sensors 1124 comprise camera and/or other optical sensors, near-field detection sensors, laser sensors, magnetic field detection sensors or a combination of the above to efficiently travel among devices and obstacles present in the foundry environment.

According to an embodiment, the AGV 1100 comprises sensors 1124 directed horizontally and adapted for approaching objects and for displacement of the AGV 1100 to avoid objects present in the foundry environment. According to an embodiment, the AGV 1100 comprises sensors 1124 directed toward the ceiling and/or the floor for alignment of the AGV 1100 relative to a pedestal 1220 to be lifted or relative to a specific location of the foundry environment.

According to an embodiment, the system comprises cameras 1274 (see FIG. 17) connected to controller 1270 (see FIG. 17) in wireless communication through a communication component 1272 (see FIG. 17) with the controller 1120 of the AGV 1100. The cameras 1274 are appropriately located to scan the foundry environment to detect devices and obstacles in the environment, such as the location of the AGV 1100, and for the controller 1270 to analyze the images captured by the cameras 1274 and to communicate direction signals to the AGV 1100 for the AGV 1100 to operate at a secure distance from obstacles present in the environment. Furthermore, when the AGV 1100 moves close to an obstacle, or is about to interact with other devices such as pedestals 1220, signals from the combination of the cameras 1274 and sensors 1124 mounted to the AGV 1100 are processed to evaluate the relative position of the AGV 1100 relative to the obstacle, and to displace the AGV 1100 with precision in the foundry environment.

Referring further to FIGS. 22A-G. Embodiments of the AGV 1100 and optionally the environment in which the AGV 1100 is to operate is adapted to control the movements of the AGV 1100 using at least one of the following methods as schematically illustrated.

Figure 22A:
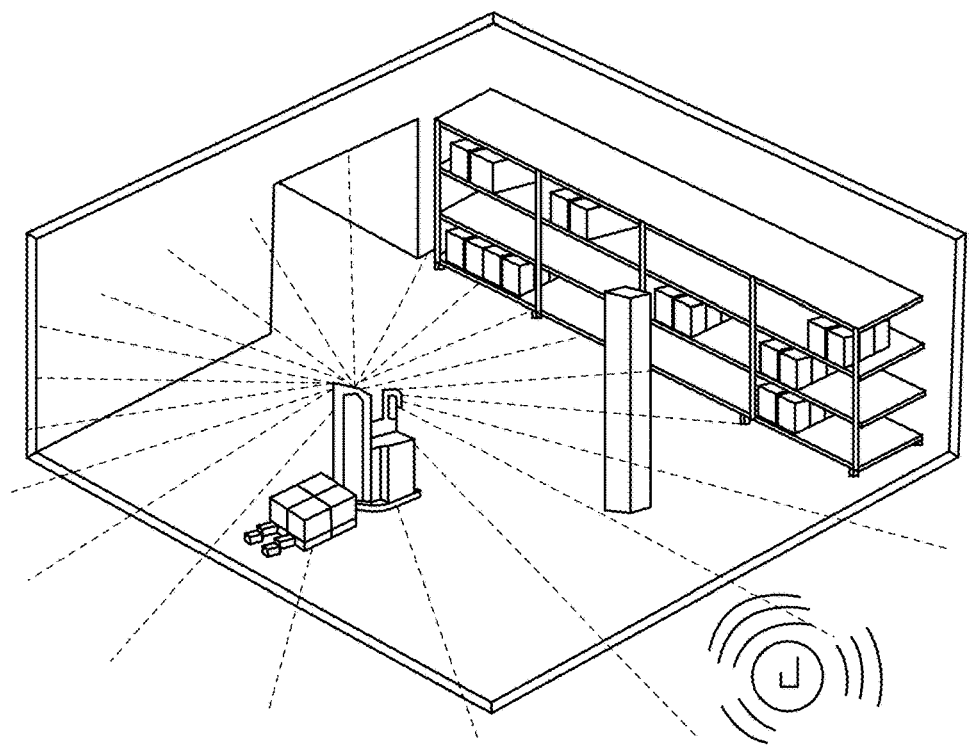
FIGS. 22A-G are schematics of embodiments of the AGV in an exemplary environment navigating using a variety of navigation solutions.

Illustrated on FIG. 22A, the AGV 1100 may determine its position according to a natural detection process. In other words, the AGV 1100 scans the environment, processes the data resulting the scan process and constructs a virtual map of the environment. Accordingly, the AGV 1100 uses the virtual map to guide its displacements.

Figure 22B:
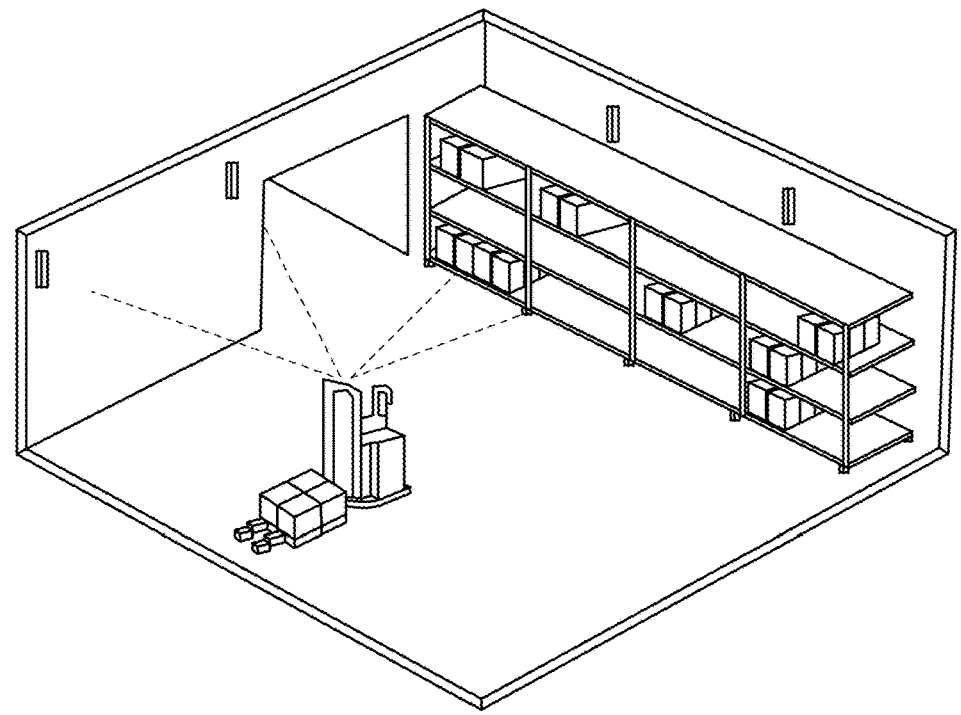

Illustrated on FIG. 22B, the AGV 1100 may use an optical solution comprising the presence of reflectors in known locations in its environment to determine its current location and orientation. The AGV 1100 thus combines a virtual map and the determined location and orientation to guide its displacements.

Figure 22C:
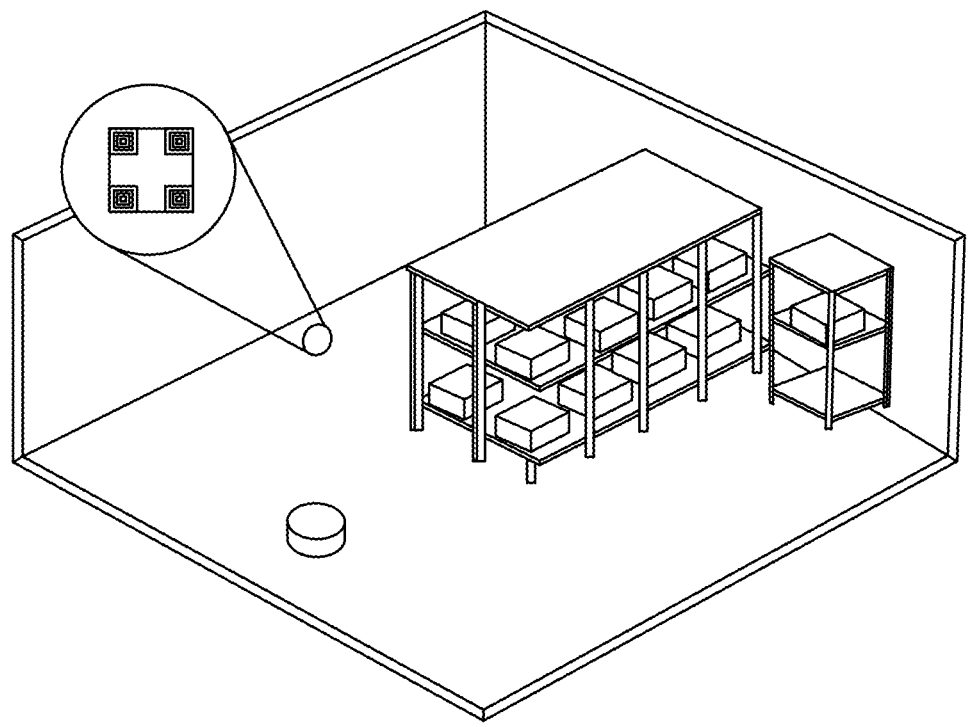

Illustrated on FIG. 22C, the AGV 1100 may use barcode stickers placed in specific locations and/or on specific apparatuses and components of the environment to recognize locations, apparatuses and components to guide displacement and/or validate interactions.

Figure 22D:
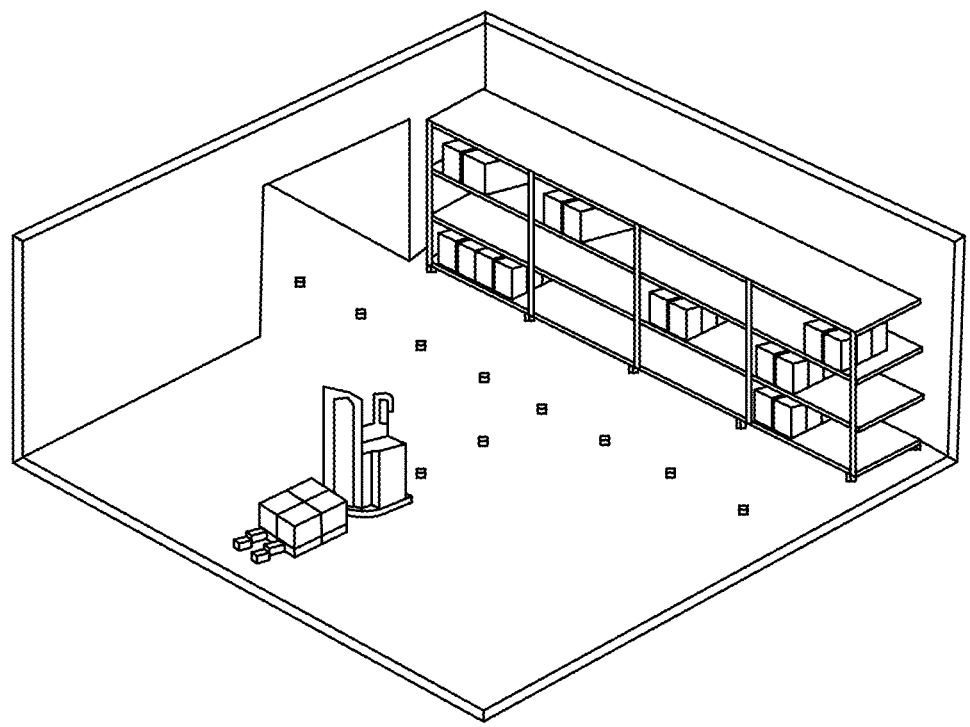

Illustrated on FIG. 22D, the AGV 1100 may use spots and other optical detectable components as guides for displacement. According to that embodiment, the normal displacement paths of the AGV 1100 are identified with such spots and the AGV 1100 guides its displacement by simply following the spots one after the other, with the number of read spots, the distance between the spots and other similar characteristics permitting to the AGV 1100 to determine its current location and orientation at all time.

Figure 22E:
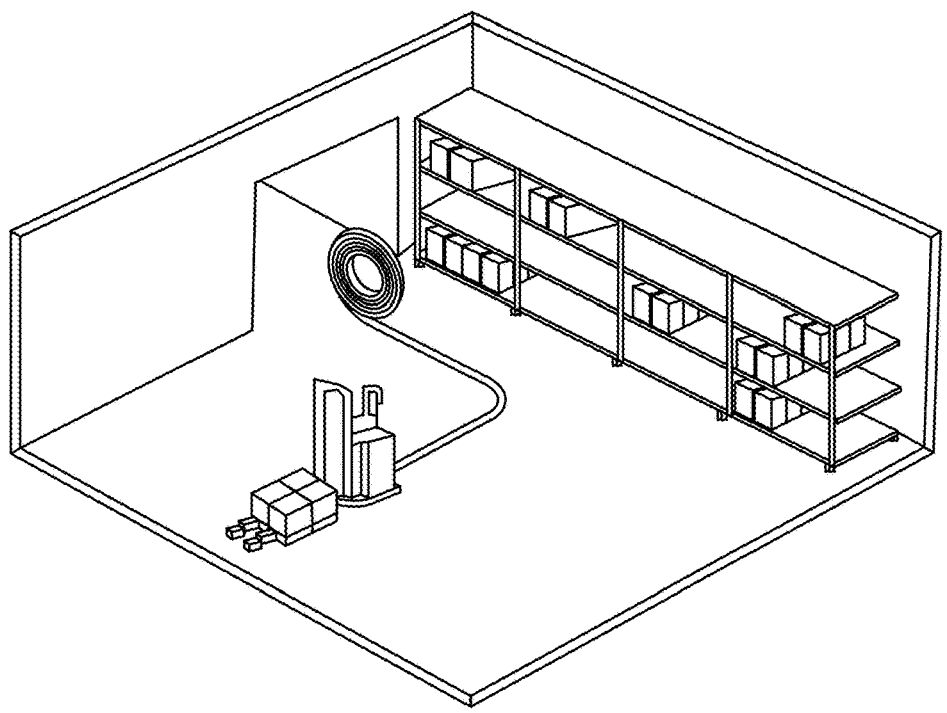

Illustrated on FIG. 22E, the AGV 1100 may operate using magnetic detection as guide. According to an embodiment, the environment comprises paths defined using magnetic tape disposed on the ground, with the AGV 1100 being able to detect decrease in the read magnetic field resulting from deviations from the magnetic tape and operating reorientation to follow the magnetic tape.

Figure 22F:
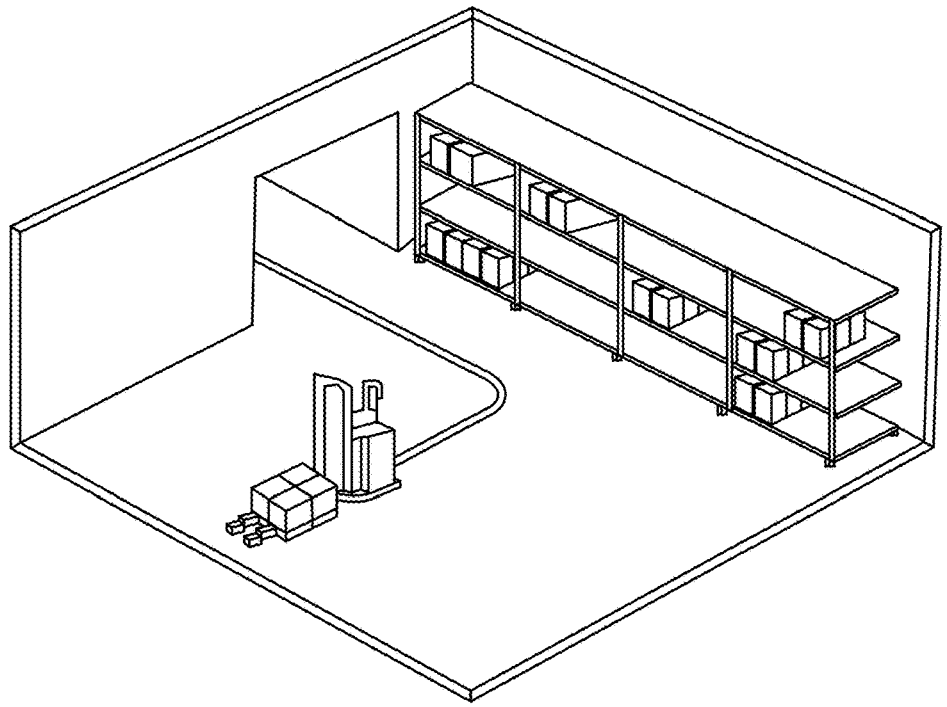

Illustrated on FIG. 22F, the AGV 1100 may operate in an environment where an inductive wire is used to set paths for displacements of the AGV 1100. As with the magnetic tape before and illustrated in relation with FIG. 22E, the AGV 1100 uses magnetic properties resulting from interaction with the inductive wire to determine and correct its orientation.

Figure 22G:
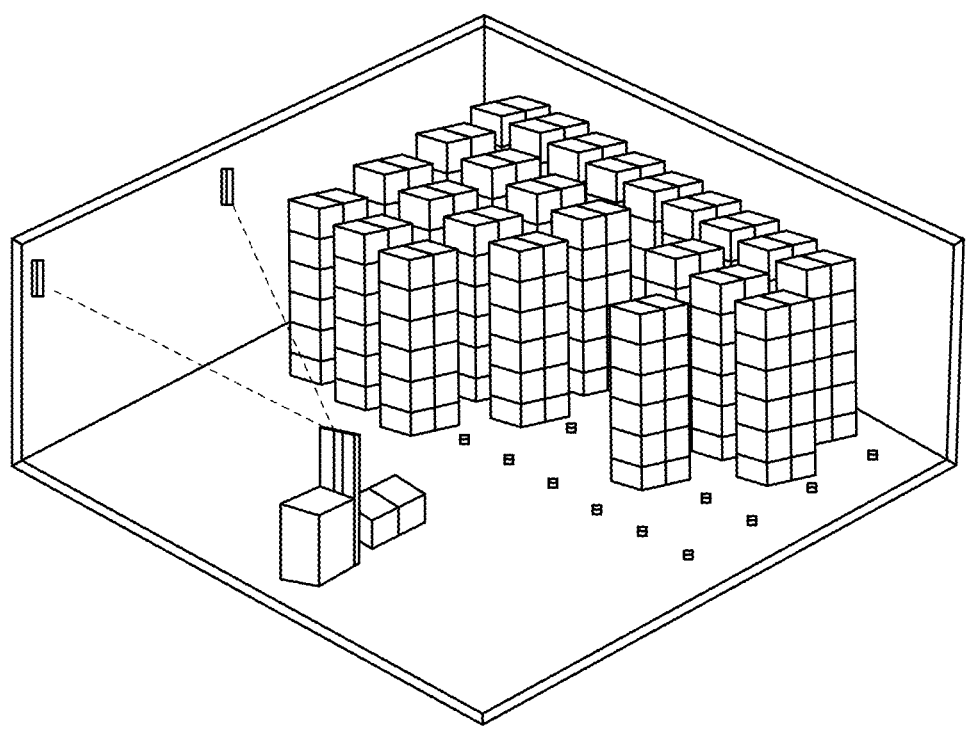

Illustrated on FIG. 22G, the AGV 1100 may operate using a multi-navigation system, comprising at least two of the solutions illustrated through FIGS. 22A to 22F.

One person skilled in the art would recognize that depending on the environment, the selected solution would vary. One person skilled in the art would further understand that the nature of the sensors 1124, the number of sensors 1124 and the processing capacity associated with the displacement would vary from one solution to another. The person skilled in the art would finally recognize that the controller processing the information from the sensors 1124 in embodiments could be located in the AGV 1100. In other embodiments, a controller, for example, a dedicated controller in communication (ex. wireless communication) with the AGV 1100 would be located away from the AGV 1100, the dedicated controller sparing the AGV 1100 from a portion of the processing and communicating displacement commands to the AGV 1100.

According to an embodiment, the power source 1106 of AGV 1100 comprises rechargeable battery cells, with the AGV 1100 being able to detect the remaining charge of the battery cells and to move about to a charging station 1130 (see FIG. 17) upon detection of the remaining charge being low, or upon determination that operation requirements allows a charge operation without hindering the realization of operations in the foundry.

According to an embodiment, an operator connects a charging cable to the AGV 1100 when the AGV 1100 is at the charging station 1130. According to another embodiment, the AGV 1100 charges autonomously the battery cells either by physically having a charging protrusion or socket contacting a complementary coupling component of the charging station 1130, or by taking place above an induction-based charging platform.

Figure 15:
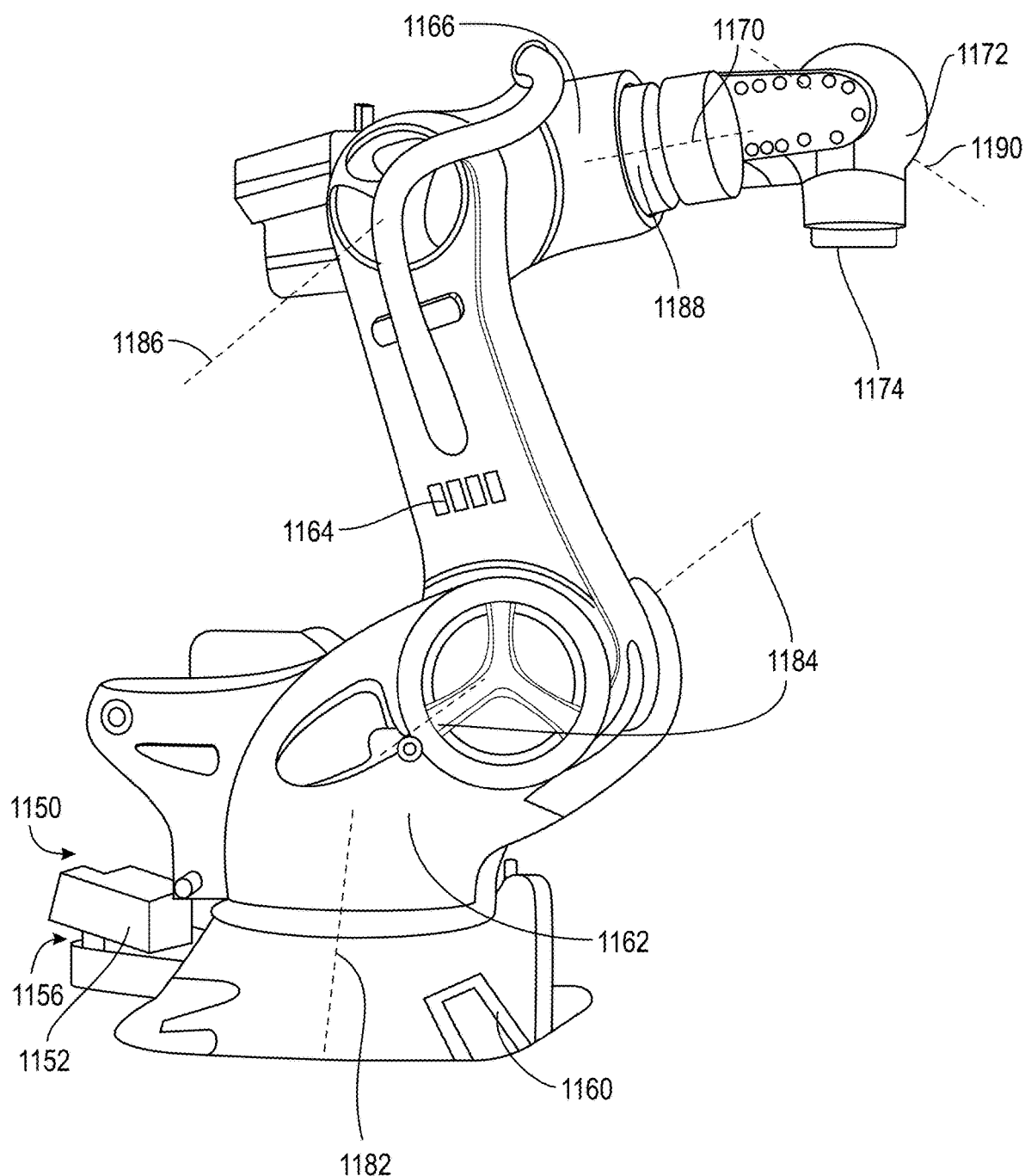
FIG. 15 is a perspective view of an automated robot part of a system for automation of operation of a foundry in accordance with another embodiment.
Figure 17:
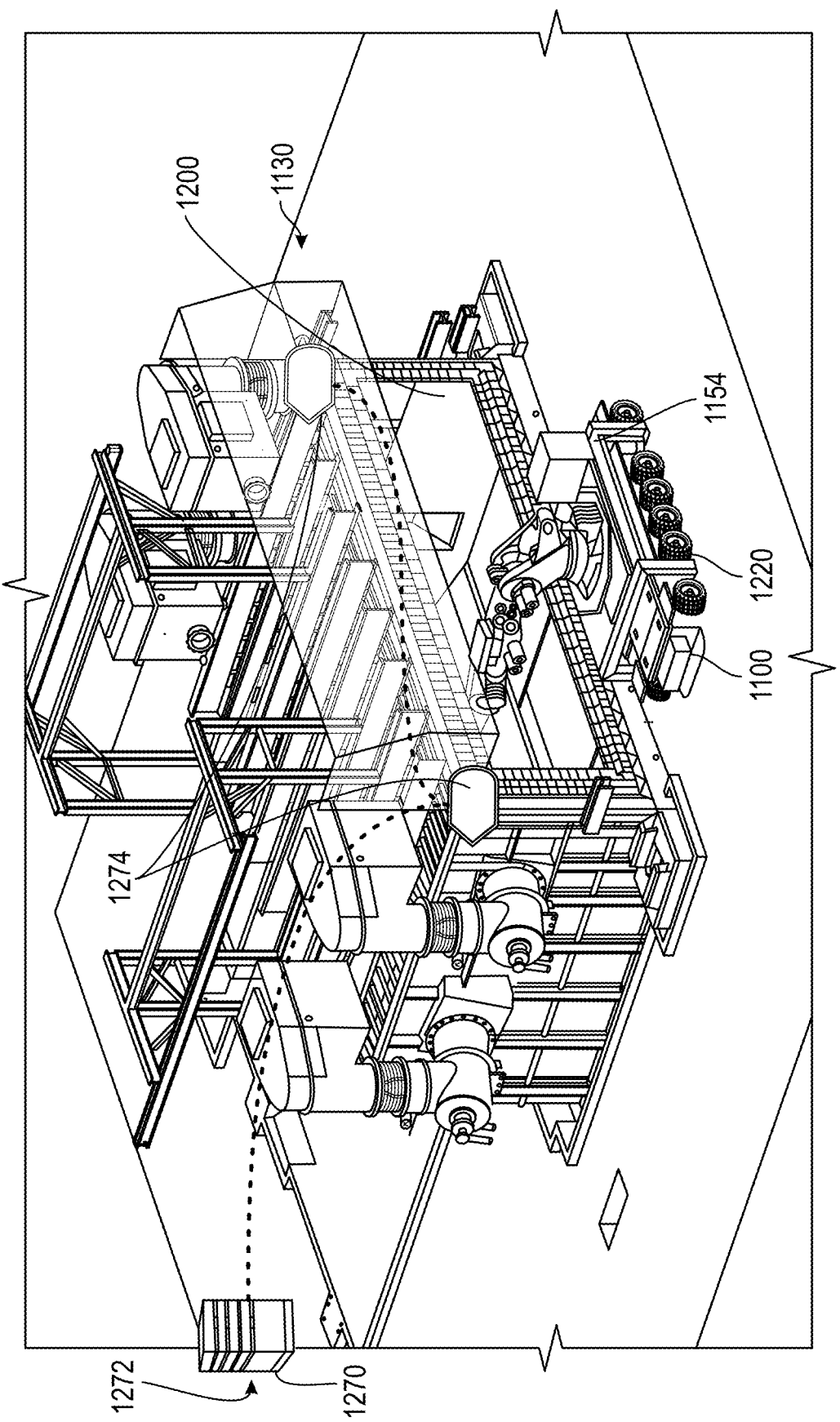
FIG. 17 is a schematic view of a combination of the automated robot of FIG. 15 and an automated guided vehicle during a scrubbing operation.

Referring now to FIG. 15, an automated robot 1150 comprises a controller 1152 and a power source 1154 (see FIG. 17). The automated robot 1150 is adapted to perform autonomously operations in the foundry, and more precisely in a furnace 1200 (see FIGS. 17-21). The robot 1150 comprises a base 1160, a first arm 1162 rotatable to the base about a first axis 1182, a second arm 1164 rotatably mounted to the first arm 1162 about a second axis 1184, a third arm 1166 rotatably mounted to the second arm 1164 about a third axis 1186, a fourth arm 1168 rotatably mounted to the third arm 1166 about a fourth axis 1188, and a fifth arm 1170 rotatably mounted to the fourth arm 1168 about a fifth axis 1190. The second axis 1184, the third axis 1186 and the fifth axis 1190 are intended for folding movements, while the first axis 1182 and the fourth axis 1188 are intended to orientation movements.

Tool jaws 1172 are located at the extremity of the fifth arm 1170, inheriting the degrees of freedom from the different arms 1162, 1164, 1166, 1168, 1170 linking the tool jaws 1172 to the base 1160. The tool jaws 1172 are designed to autonomously grip a tool (see FIGS. 17-21) and to operate the tool in the foundry environment according to signals from the controller 1152.

The tool jaws 1172 are therefore adapted to perform two types of manipulations of the tools: translation of the tool, e.g., to move the tool according to a desired course; and rotation of the tool, e.g., to make the tool spin, to make the tool rub against a surface through an angular movement or to make the tool operate according to a reciprocating angular movement.

The automated robot 1150 further comprises a cooling system 1156 for cooling down portions of the automated robot 1150 operating in a high temperature environment, or subject to overheating. The cooling system 1156 comprises a fan (not shown), ducting (not shown), valves (not shown) and a plurality of vortex coolers (not shown) generating vortices of air forced by the fan in the ducting and expulsed by the vortex coolers about thermally sensitive components in air vortexes cooling down these thermally sensitive components.

According to an embodiment, the cooling system 1156 comprises one or more air inlets (not shown) acting as air input for fresh air in the cooling system 1165, with the air inlets being located about the base 1160 with the vortex coolers being in part located about the tool jaws 1172 since the tool jaws 1172 are part of the components operating during extended periods in a high temperature environment, e.g., the furnace 1200 (see FIG. 17).

According to an embodiment, a pressurized air system (not shown) is fluidly connected to the cooling system 1156; the pressurized air system feeding the cooling system 1156 with air, whereby the cooling system 1156 is fed with air of controlled characteristics.

According to an embodiment, the automated robot 1150 comprises sensors (not shown) comprising optical sensors, thermal sensors, and/or other sensors for monitoring the operation of the automated robot 1150 as the current condition of the automated robot (location, temperature, distance to a surface, etc.). The information collected by the sensors are transmitted to the controller 1152, the latter using these inputs in the determination of movements of the automated robot 1150.

Figure 16:
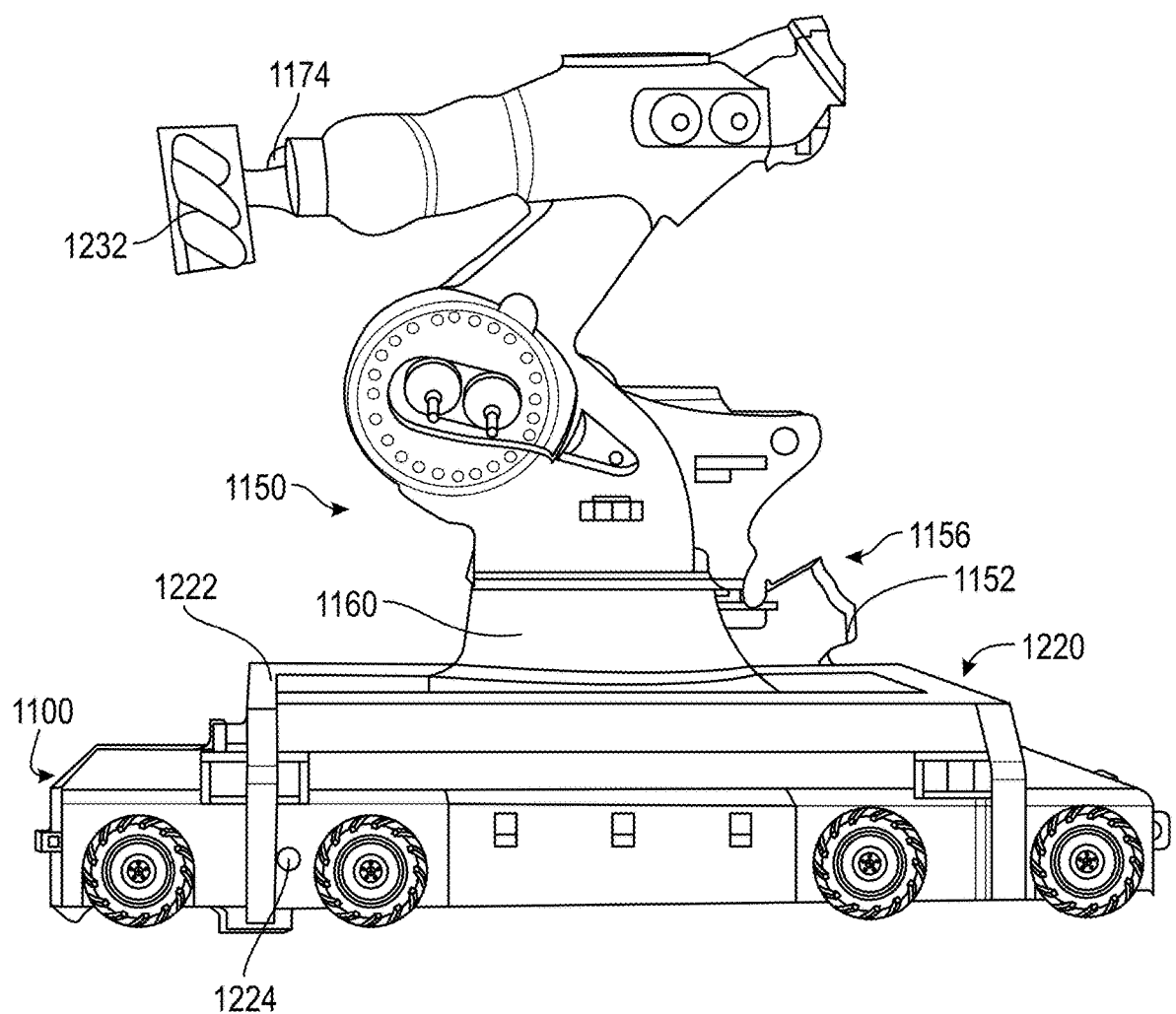
FIG. 16 is a perspective view of a combination of the automated robot of FIG. 15 and an automated guided vehicle, wherein the automated robot is mounted to a pedestal and a tool is mounted to the automated robot.

Referring now to FIG. 16, the automated robot 1150 is mounted to a pedestal 1220 comprising a platform 1222 and feet 1224. The automated robot 1150 is secured to the platform 1222 able to undergo displacement without moving relative to the platform 1222. The pedestal comprises four (4) feet 1224 located on the four (4) corners of the platform 1222, ensuring stability of the pedestal when on the ground. The feet 1224 are of a length and are distant enough widthwise from each other for the AGV 1100 to drive under the pedestal 1220. The platform 1222 has a length that provides a surface length sufficient for the hydraulic jacks 1112 to be all located below the platform 1222, and thereby to lift the platform 1222.

According to an embodiment, the pedestal 1220 is designed to correspond to the dimensions of the AGV 1100, to support the weight of the automated robot 1150 to be mounted thereto, and to ensure stability of the combination pedestal 1220/AGV 1100 in all possible positions of the automated robot 1150 in normal condition (e.g., using any tool (see FIGS. 17-21) or when lifting a weight within preset ranges).

Referring now to FIG. 17, the system for automatization of operations in a foundry is adapted to operate from a position wherein the pedestal 1220 is positioned about the opening of a furnace 1200 to melt metal. The automated robot 1150 is adapted to operate with a substantial portion of its components present in the furnace 1200, while the base 1160 secured to the pedestal 1220 remains outside the furnace 1200; the portions of the automated robot 1150 operating in the high temperature furnace 1200 being cooled down by vortex coolers 1208 fed with fresh air.

On FIG. 17 the automated robot 1150 performs a cleaning operation over the surfaces of the furnace 1200. More precisely, the automated robot 1150 has a cylindrical scrubbing tool 1232 (see FIG. 16) mounted thereto and is spinning the cylindrical scrubbing tool 1232 to scrub material off the surfaces of the furnace 1200.

One must note that the AGV 1100 is located below the pedestal 1220. According to an embodiment, during the operation, the AGV 1100 remains under the pedestal 1220, lifting the pedestal 1220 and moving the pedestal 1220 from position to position in parallel to the front (open portion) of the furnace 1200 to enable the automated robot 1150 to reach wall surfaces of the furnace 1200 that would not be reachable with a floor-secured robot arm.

Figure 18:
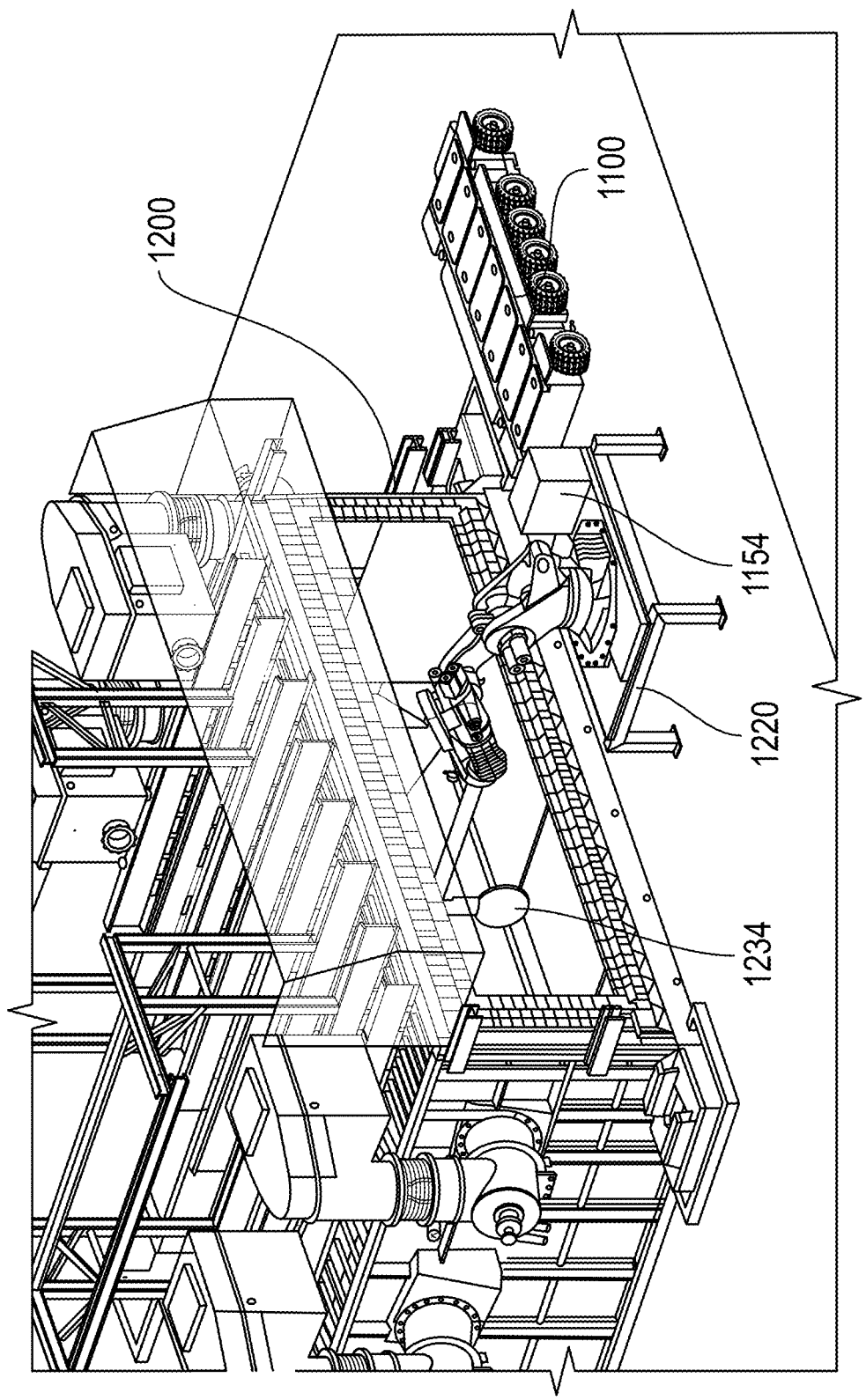
FIG. 18 is a schematic view of the combination of the automated robot of FIG. 15 and an automated guided vehicle during a mixing operation.

FIG. 18 shows the automated robot 1150 with a mixing tool 1234 mounted to the tool jaws 1172. The AGV 1100 is illustrated away from the pedestal 1220, in an idle position, as the automated robot 1150 performs the mixing operation. The shown moment illustrates the autonomous operations of the automated robot 1150 from the operations of the AGV 1100. In the example, the AGV 1100 travels away from the pedestal 1220 toward the charging station 1130 to optimize the extended time during which the automated robot 1150 mixes the metal by increasing the charge of its battery cells, while moving away from the furnace 1200 to keep its components in an acceptable temperature range.

Figure 19:
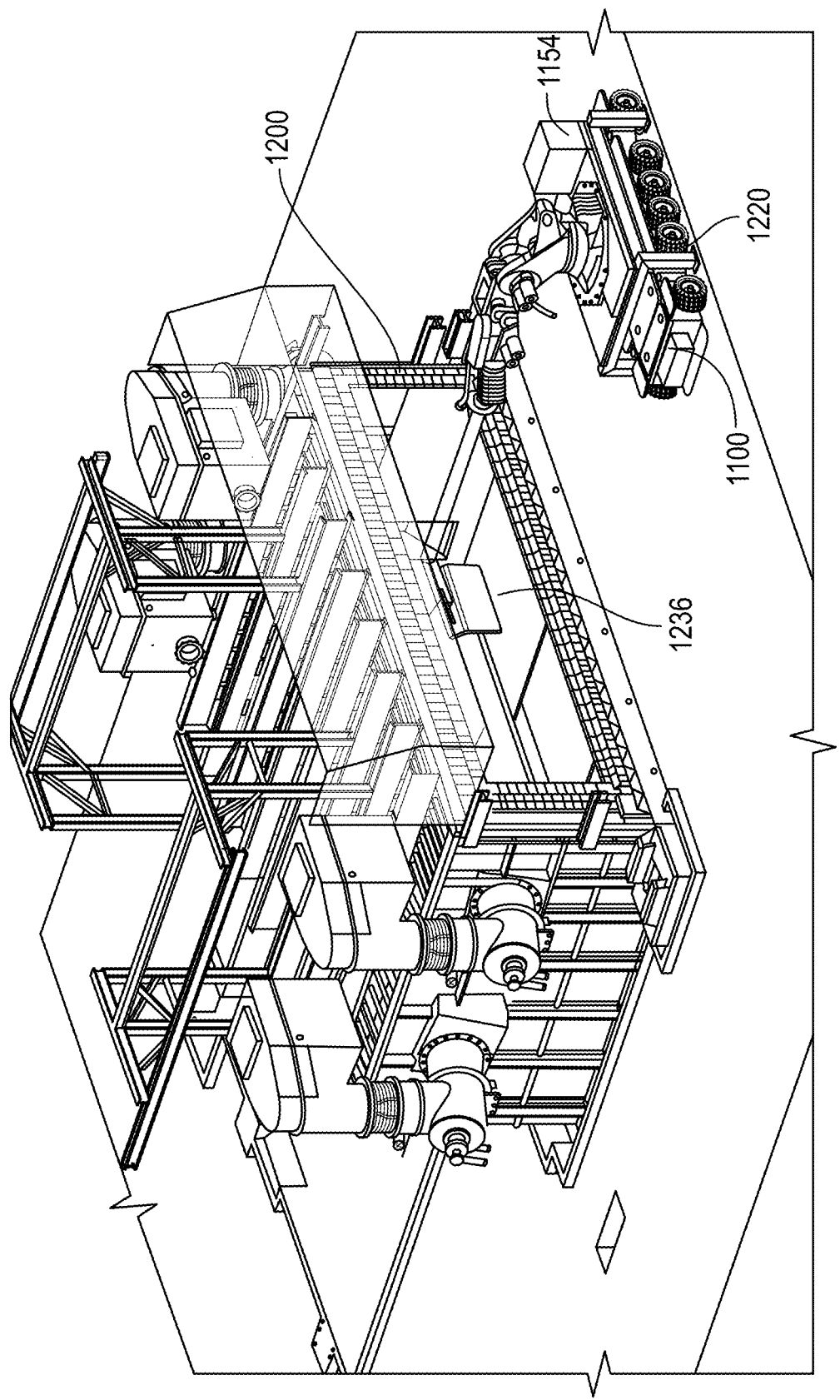
FIG. 19 is a schematic view of the combination of the automated robot of FIG. 15 and an automated guided vehicle during a skimming operation.

FIG. 19 shows the automated robot 1150 performing a skimming operation using a skimming tool 1236 mounted to the tool jaws 1172. FIG. 19 shows the AGV 1100 moving the pedestal 1220 and the automated robot 1150 away from the opening of the furnace 1200 during operation.

Figure 20:
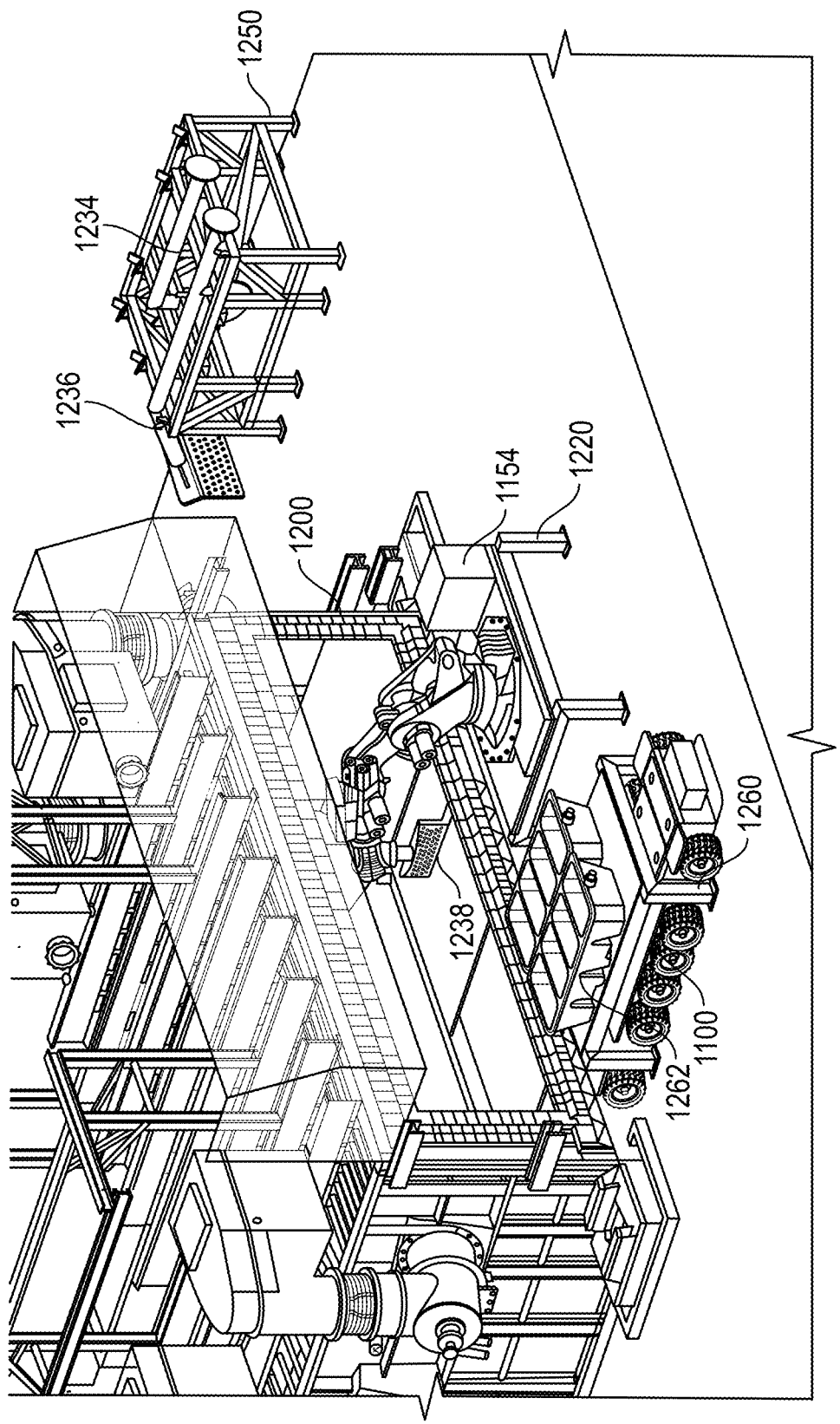
FIG. 20 is a schematic view of the combination of the automated robot of FIG. 15 and an automated guided vehicle during a dross collection operation, with a second pedestal disposed beside the automated robot on which are laid bins.

FIG. 20 shows the automated robot 1150 performing a dross collecting operation using a dross collecting tool 1238 mounted to the tool jaws 1172. FIG. 20 shows the tool stand 1250 with the skimming tool 1236 and the mixing tool 1234 laid down on the tool stand 1250. FIG. 20 shows free space about the to-be-grabbed extremity of tools 1234, 1236 for the AGV 1100 to move the automated robot 1150 about that extremity of the tool stand 1250 where the automated robot 1150, on order to change operation from one tool to another, takes a position wherein the currently mounted tool is laid over the tool stand 1250 at its location, the automated robot 1150 releases the grip of the tool, moves tool jaws 1172 near the next tool to be utilized, grabs the tool with the tool jaws 1172, and is ready for the next operation. At this step, the AGV 1100 moves the pedestal 1220, thus the automated robot 1150 to the position to perform the next operation.

According to an embodiment, the automated robot 1150 requires a manual operation from a user to release a tool from the tool jaws 1172 to secure a tool to the tool jaws 1172.

FIG. 20 further shows the use of an additional pedestal 1260 on which are laid bins 1262 to receive dross collected from the furnace 1200. Once all the dross is collected, the AGV 1100 moves the pedestal 1260 to an appropriate location and travels back to the pedestal 1220 mounted with the automated robot 1150 to move the pedestal 1220 according to programmed operations.

Figure 21:
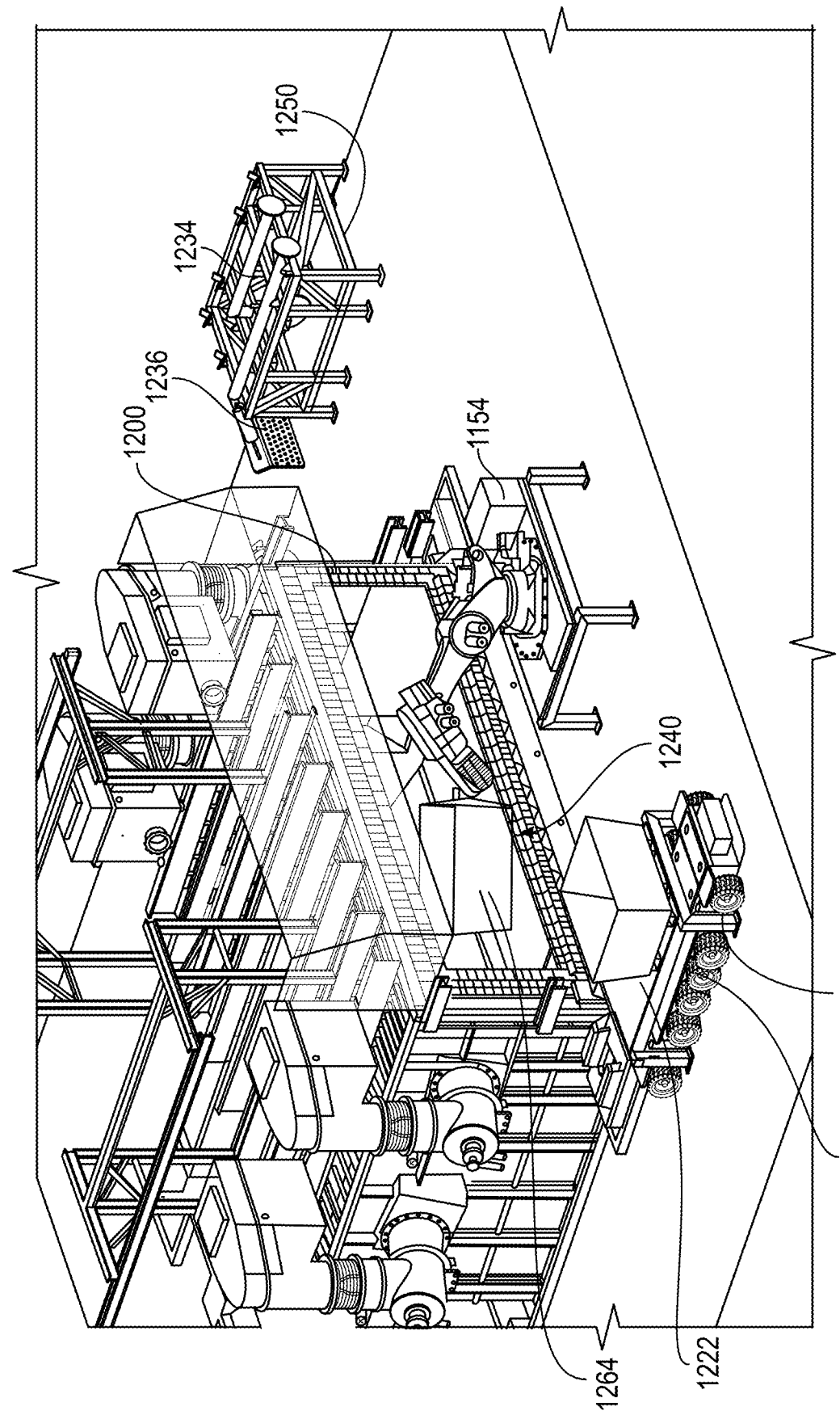
FIG. 21 is a schematic view of the combination of the automated robot of FIG. 15 and an automated guided vehicle during a container moving operation, with a second pedestal is disposed beside the automated robot adapted for containers to be laid down thereon.

Referring to FIG. 21, the automated robot 1150 is further adapted to move containers 1264 of variable dimensions in and out of the furnace 1200. A lifting tool 1240 is accordingly mounted to the tool jaws 1172, with the automated robot 1150 using the lifting tool 1240 to lift the container 1264, move the container 1264 from the interior of the furnace 1200 to the platform 1222 of the pedestal 1260, and to put down the container 1264 on the platform 1222 of the pedestal 1260 where the AGV 1100 can move the containers 1264 away from the furnace 1200 by lifting the pedestal 1260 and driving away from the furnace 1200 to a preset location.

According to embodiments, the variety of operations performed by the system for automatization of operations in a foundry comprises preparation and handling of containers containing alloy metals, filling and handling of bins containing throw-away material, operation of skimming coolers, various cooling operation in and out of the furnace 1200, various handling, moving and mixing operations, etc. Accordingly, the system for automatization of operations in a foundry is adapted to perform various operations in high temperature environment that may require lifting power, that involves at most short distances displacement (within the limits of the foundry environment), and wherein energy consumption for these operations are limited and relatively well controlled.

According to embodiments, the present system for automatization of operations in a foundry has advantages over previous solutions comprising allowing to modify the ratio of AGVs 1100/automated robots 1150/furnace 1200 based on requirements and operations determined to be performed by the system. A further advantage of the system consists in the AGVs 1100 being able to vary their paths based on the current conditions and based on changes in the foundry environment as they are detected. A further advantage of the present system over for instance rail-based solutions resides in the preparation requirement of the foundry environment being limited to having the spaces in which the AGVs 1100 may circulate on the same level, and the level of the floor respecting limit parameters regarding for example slopes. It further has the advantages of having no cable, ducting or other tailing components laying on the floor at different locations based on locations and movements of components.

Figure 23:
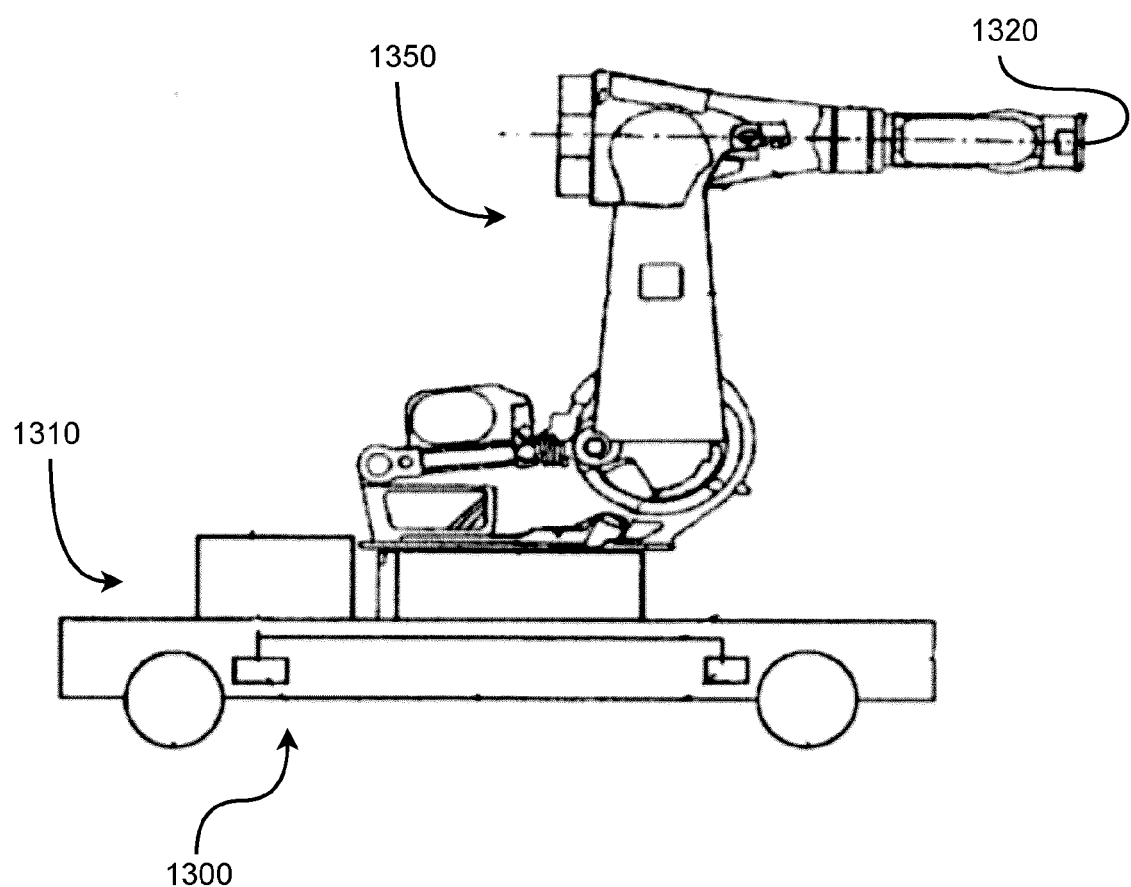
FIG. 23 is a side view of an embodiment of a combined AGV and robot.

Referring now to FIG. 23. According to another embodiment, an autonomous robot 1300 combines the functions of the AGV 1100 and the automated robot 1150 in a single autonomous component. The autonomous robot 1300 comprises an AGV-type component 1310 adapted to perform the displacement function described before in relation with the AGV 1100. The AGV-type component 1310 therefore is able to control displacements of the autonomous robot 1300 in its environment.

The autonomous robot 1300 further comprises a robot-type component 1350 mounted to the AGV-type component 1310 in a temporary fashion or a permanent fashion. The robot-type component 1350 is adapted to perform similar functions as described before in relation wo the automated robot 1150.

The autonomous robot 1300 differs from the before-described distinct AGV-automated robot combination in combining components and functions that are distinctly operated when the AGV 1100 and automated robot 1150 are distinct apparatuses. Such a combination allows to avoid unnecessary components, duplicate components and/or to allow functionally optimization components.

According to an embodiment, the AGV-type component 1310 does not comprise hydraulic jacks 1112 since the robot-type component 1350 is mounted is a permanent or semi-permanent fashion to the AGV-type component 1310.

According to an embodiment, the AGV component 1310 and the robot-type component 1350 share a single power source (not shown), typically battery cells (not shown) that are located in the AGV-type component 1310. Thus, the autonomous robot 1300 results in a lower center of mass. The autonomous robot 1300 further necessitates a single power control unit (not shown) to manage for all power-related functions.

According to an embodiment, the autonomous robot 1300 comprises a cooling system (not shown) comprising a first cooling subsystem (not shown) substantially similar to the cooling system 1156 and responsible to maintain the temperature of the robot-type component 1350 in the operating range, and further a second cooling subsystem (not shown) responsible to maintain the temperature of the AGV-type component 1310 in a second operating range determined based on the specific components part of the AGV-type component 1310 such as the battery cells (not shown). According to an embodiment, the first cooling subsystem and the second subsystem share a single fan and/or compressed air forcing system (not shown) feeding in cooling fluid the first cooling subsystem and the second subsystem.

According to an embodiment, the robot-type component 1350 is movable over the AGV-type component 1310 along the longitudinal orientation of the AGV-type component 1310. According to that embodiment, the robot-type component 1350 benefits from the low center of mass and extended mass of the AGV-type component 1310 along its longitudinal axis to stabilize the autonomous robot 1300 when operations of the robot-type component 1350 require a long reach, thus relatively distant from the center of the AGV-type component 1310. According to an embodiment, the robot-type component 1350 is mounted to rails (not shown) themselves mounted to the AGV-type component 1310, with a hydraulic compressor (similar to hydraulic compressor 1110, not shown) powering displacements of the robot-type component 1350 on the rails.

Further, according to embodiments, sensors (not shown) similar to sensors 1124 may be mounted to the robot-type component 1350 when more elevated location(s) for the sensor(s) ease the detection of the environment, thus displacement of the autonomous robot 1300.

Thus, one must conclude that the present system for automatization of operations in a foundry features more adaptability than any existing solutions.

It should be noted that even though a variety of realizations are provided and described herein, with the components of the realizations being described, alternative realizations are intended to be encompassed within the description, the variety of realizations being limited solely by the number of possible combination of two or more of the described components such has having the resulting realization being able to perform one or more of the functions and the operations described herein.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A displaceable robot for performing operations near a high temperature furnace containing molten metal, wherein the robot is displaceable using a vehicle, the robot comprising:
 a frame having a ground interface for coming into contact with a ground surface while defining a clearance under a portion of the frame for engaging with the vehicle to displace the robot about the furnace when the ground interface is off the ground;
 a first tool;
 an arm mounted to the frame, the arm comprising an end effector which is adapted for mounting the tool;
 sensors for collecting exteroceptive data in a vicinity of the robot and proprioceptive data from the robot; and
 a controller receiving the collected data from the sensors and controlling a movement of at least the arm based on the collected data and modifying operation of the robot when outside of operating parameters.

2. The robot of claim 1, wherein the sensors comprises an image-capturing sensor mounted on the frame distant from the end effector, wherein the image-capturing sensor is adapted for collecting data regarding at least one of a position of the end effector and a content of the furnace.

3. The robot of claim 1, wherein the robot operates according to temperature conditions, wherein the sensors comprise a thermo-sensor and wherein the thermo-sensor is mounted to the arm about the end effector, and wherein the thermo-sensor is adapted for collecting temperature data to determine whether temperature conditions remain within the operating parameters of the robot.

4. The robot of claim 1, further comprising a cooling system, wherein the cooling system cools down components of the robot.

5. The robot of claim 4, wherein the cooling system comprises: an air inlet away from the end effector; a compressor connected to the air inlet and compressing air collected through the air inlet and a vortex cooler connected to the compressor and exhausting compressed air about the end effector of the robot to be cooled down.

6. The robot of claim 1, further comprising a driving assembly driving the arm and hence the end effector along a trajectory.

7. The robot of claim 1, wherein the ground interface comprises feet supporting the frame above ground and wherein the robot comprises feet driving means for vertically extending and contracting the feet thereby respectively raising and lowering the frame, wherein the controller, by controlling the feet driving means, controls a height of the clearance.

8. The robot of claim 1, wherein the frame comprises an underface facing the clearance and adapted for contacting the vehicle when displacing the robot.

9. The robot of claim 8, further comprising an induction charger about the underface.

10. The robot of claim 1, wherein the ground interface comprises feet supporting the frame above ground, wherein the feet are distant from each other relative to a first orientation, with the clearance extending between the feet.

11. The robot of claim 10, further comprising battery cells powering at least one of the arm, the controller and the sensors, wherein the robot comprises a cabinet extending at least below the center of gravity of the frame about at least one of the feet and housing at least one of the battery cells and the controller.

12. The robot of claim 1, further comprising a second tool, wherein the robot further comprises tool jaws for autonomously gripping and operating a tool among the first tool and the second tool, and wherein the first tool and the second tool are selected among a mixing tool, a skimming tool, a dross collecting tool and a lifting tool.

13. A system for performing operations using a first tool near a high temperature furnace containing molten metal, the system comprising:
 an Automated Guided Vehicle (AGV) comprising a navigation system controlling displacement of the AGV; and
 a robot comprising:
  a frame defining a clearance about which the AGV engages with the robot for displacing the robot along with the AGV;
  an arm mounted to the frame, the arm comprising an end effector which is adapted for mounting the tool;
  sensors for collecting exteroceptive data in a vicinity of the robot and proprioceptive data from the robot;
  a controller determining displacement of the end effector along a trajectory according to sensors, thereby displacing the first tool during operations near the high temperature furnace;
 wherein the AGV and the robot perform their respective operations independently from each other.

14. The system of claim 13, wherein the robot comprises an underface facing the clearance and the AGV comprises a platform contacting the underface for displacing the robot.

15. The system of claim 13, wherein the robot and the AGV comprise electrical charge exchange components for exchanging electrical power without contacting each other when the AGV is engaged in the clearance.

16. The system of claim 13, wherein at least one of the robot and the AGV comprises a lifting means for controllably engaging contact between the robot and the AGV.

17. The system of claim 13, wherein the sensors comprises an image-capturing sensor mounted on the frame distant from the end effector, wherein the image-capturing sensor is adapted for collecting data regarding at least one of a position of the end effector and a content of the furnace.

18. The system of claim 13, wherein the robot comprises feet that are distant from each other relative to a first orientation, with the clearance extending between the feet.

19. The system of claim 18, wherein at least one of the sensors are for collecting data from at least an area surrounding the arm and the system further comprises battery cells powering at least one of the arm, the controller and the sensors, wherein the robot comprises a cabinet extending at least below the center of gravity of the frame about at least one of the feet and housing at least one of the battery cells and the controller.

20. The system of any claim 13, further comprising a cooling system comprising: an air inlet away from the end effector that is adapted for collecting compressing air; and vortex cooler fluidly connected to the air inlet and adapted for exhausting the compressed air about the end effector to be cooled down.

* * * * *